United States Patent [19]

Uchida

[11] 4,438,326

[45] Mar. 20, 1984

[54] SYSTEM FOR PERFORMING TRANSACTIONS

[75] Inventor: Yasuo Uchida, Takatsuki, Japan

[73] Assignee: Omron Tateisi Electronics Company, Kyoto, Japan

[21] Appl. No.: 276,793

[22] Filed: Jun. 24, 1981

[30] Foreign Application Priority Data

Jun. 24, 1980 [JP] Japan ................................. 55-86279

[51] Int. Cl.³ .......................... G06F 15/30; G07F 7/08
[52] U.S. Cl. .................................... 235/379; 235/380; 235/382; 364/401; 364/408; 364/900; 340/825.33
[58] Field of Search ....................... 364/401, 408, 900; 371/29; 235/379, 381, 382, 380, 382.5; 340/712, 716, 721, 725, 825.33

[56] References Cited

U.S. PATENT DOCUMENTS

| | | | |
|---|---|---|---|
| 3,833,885 | 9/1974 | Gentile et al. | 235/379 |
| 3,876,864 | 4/1975 | Clark et al. | 235/379 |
| 3,943,335 | 3/1976 | Kinker et al. | 235/379 |
| 4,134,537 | 1/1979 | Glaser et al. | 235/379 |
| 4,135,662 | 1/1979 | Dlugos | 371/29 |
| 4,251,816 | 2/1981 | Eppley | 340/722 X |
| 4,310,839 | 1/1982 | Schwerdt | 340/712 |
| 4,355,369 | 10/1982 | Garvin | 235/379 X |

Primary Examiner—Jerry Smith
Assistant Examiner—William G. Niessen

Attorney, Agent, or Firm—Armstrong, Nikaido, Marmelstein & Kubovcik

[57] ABSTRACT

A system for performing the desired transaction when the customer follows a specified procedure comprising a sequence of steps includes an electronic visual display unit for displaying a message and an illustration at the same time, a plurality of function buttons arranged in the vicinity of the display unit, a clerk key to be manipulated by the clerk and a memory having stored therein the terms, messages and illustrations to be displayed on the display unit. For customer processing, the display unit displays stepwise, immediately before each of the steps is followed by the customer, an instruction comprising the combination of a procedure specifying message describing the procedure to be followed by the customer and a procedure specifying illustration graphically showing the procedure in corresponding relation to the message. For clerk processing, the display unit shows, in response to an input through the clerk key, function indicating terms representing the processing items to be executed by the clerk and corresponding to the function buttons. When a test mode is selected by the clerk, the display unit shows an operation test code for the function button concerned. When a trouble has been detected, the display unit shows the cause of the detected trouble and an instruction for the clerk. The display unit further shows, for the function button concerned, a function indicating term representing the processing item to be executed for the remedy of the detected trouble.

17 Claims, 49 Drawing Figures

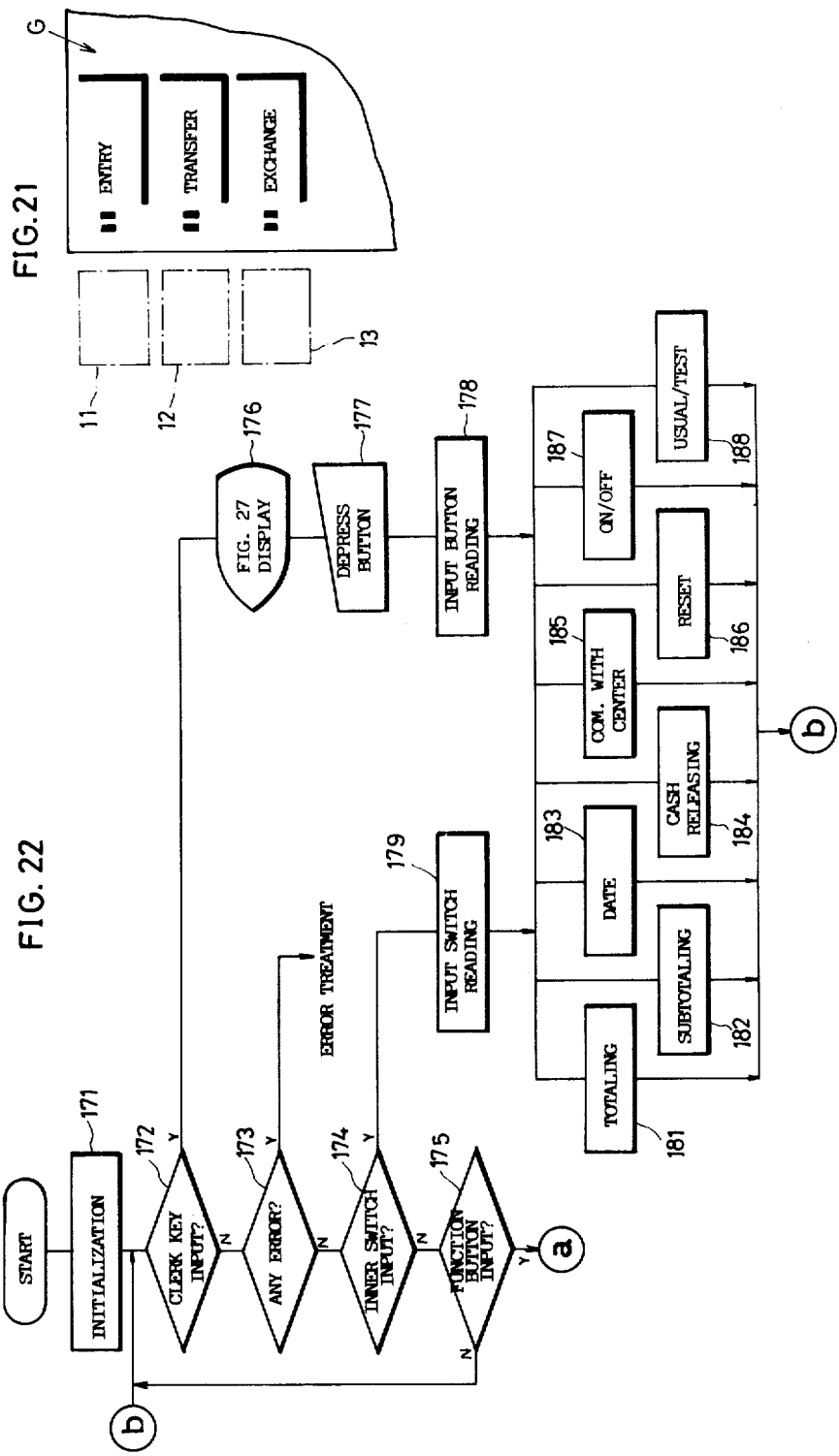

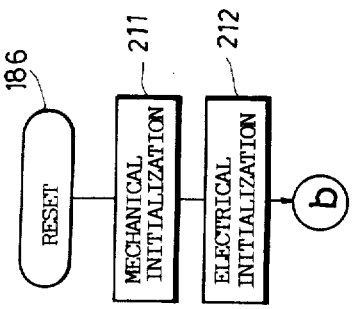
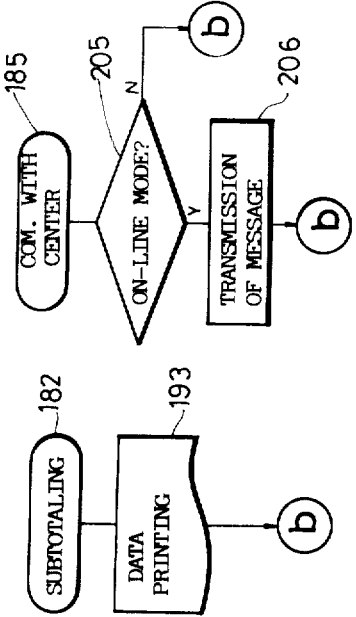
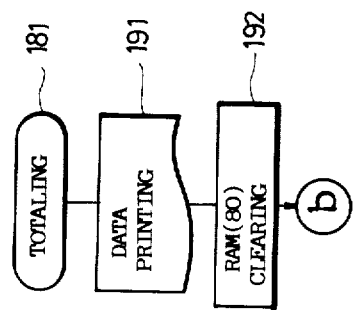
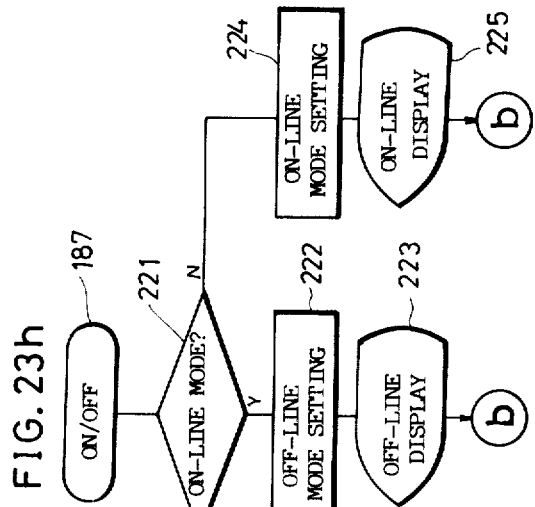
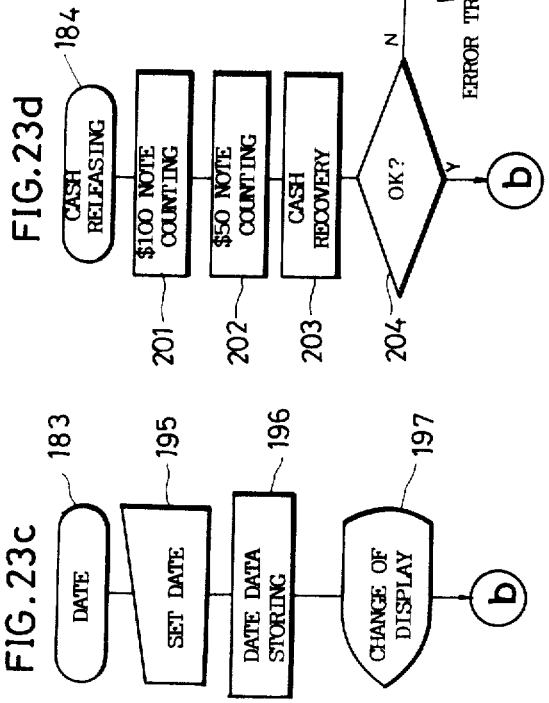

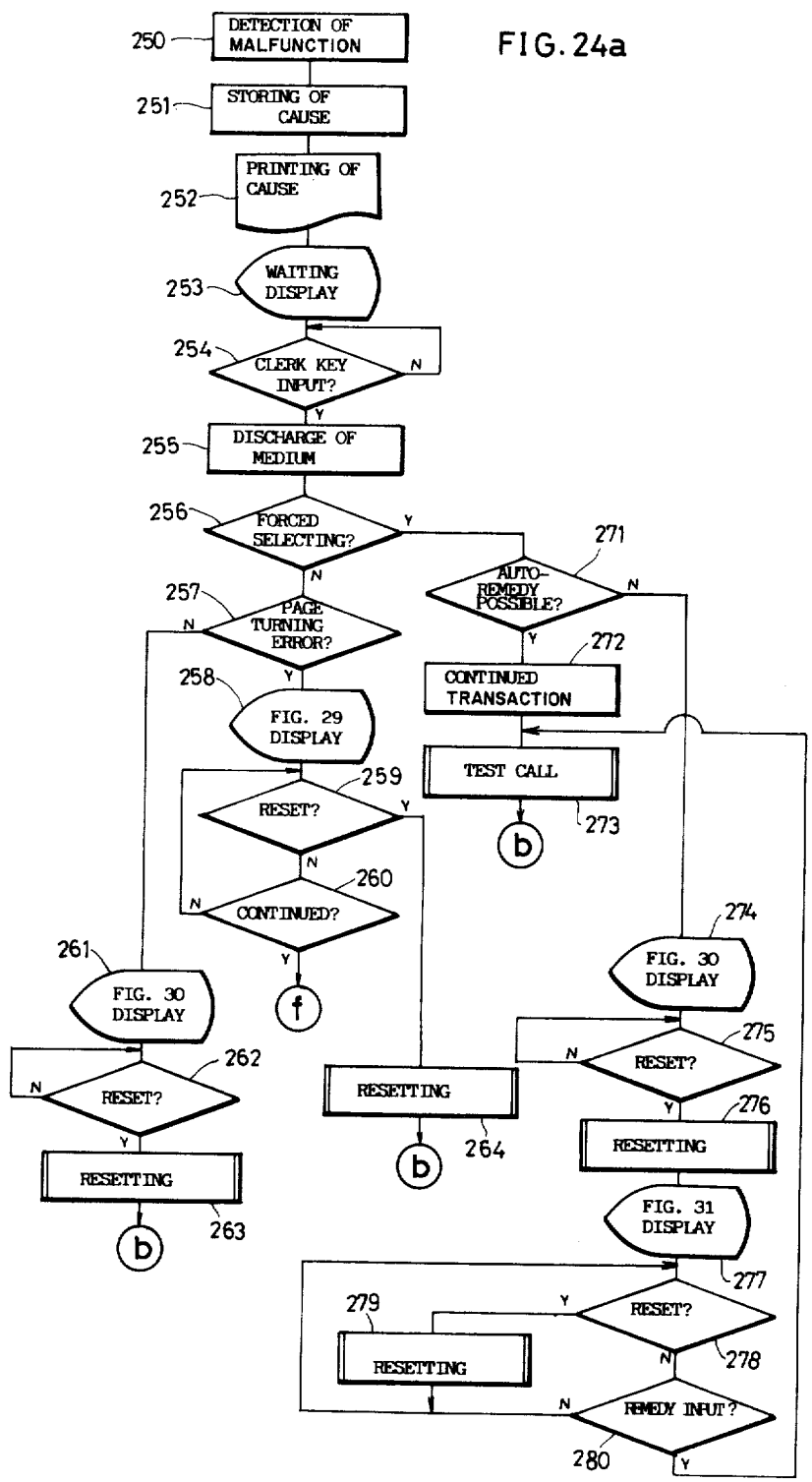

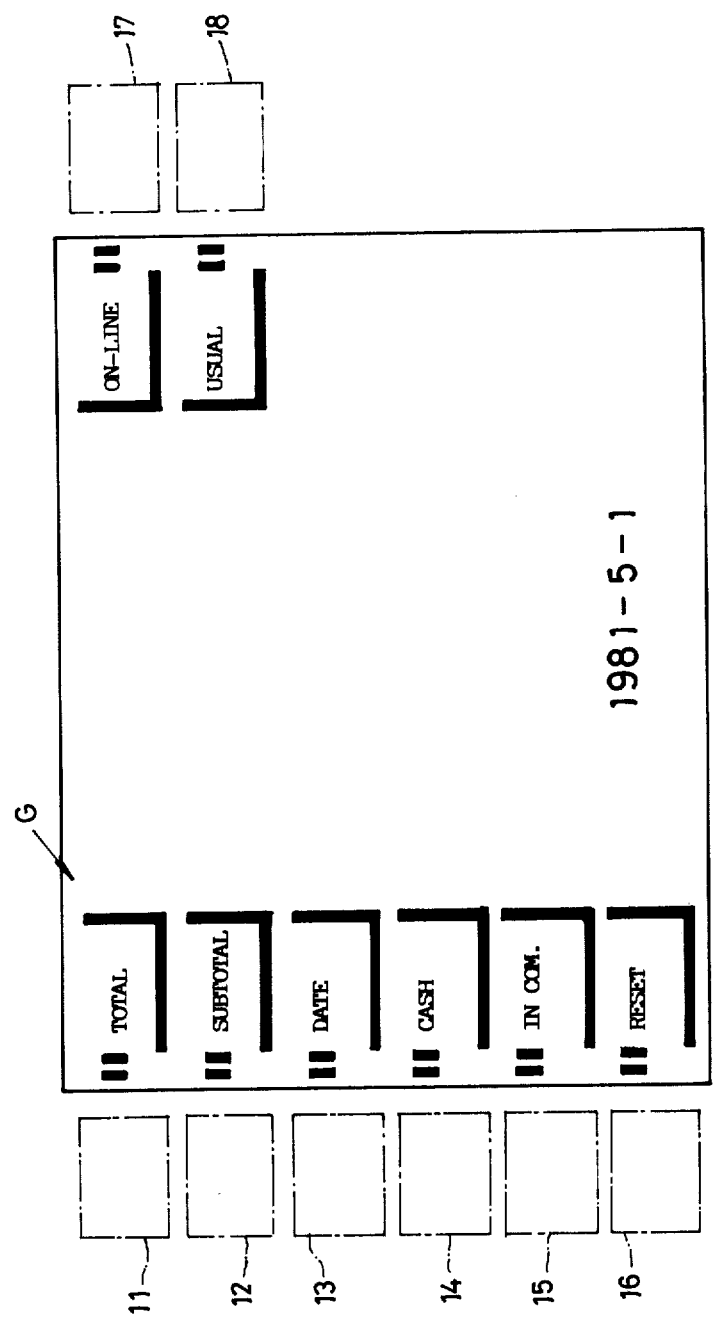

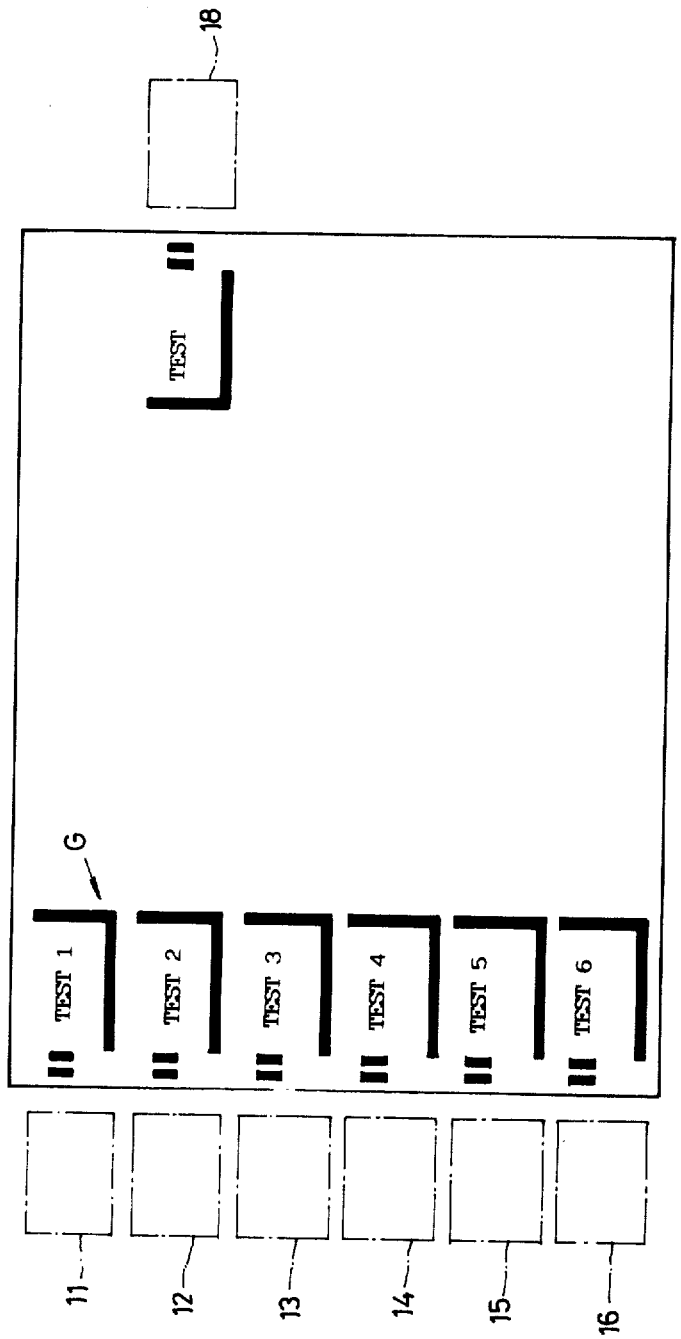

```
CARD READING TEST              RESET
     READING REPEATED   123 TIMES 1 9 0 1 9 2 0 1 2 3 . . . . . . 4 5 C
     B 1 C A 5 . . . . . . . . . . . . 1 6 A
     0
```

```
MTC = 716          CARD READING ERROR
     READING REPEATED        125 TIMES

ERROR IN READING BANK NO.
```

DATA OF ONE BANK NOTE 0 1 0 1 1 1 0 2     RESET

1st data

2nd data $370

$100 ... 2     $50 ... 3     $10 ... 2

MTC = 753     BANK NOTE DISCRIMINATING ERROR

SUM TESTED     $160

4TH NOTE JAMMING

FIG.36

```
CTR = 5            MTC = 098
DISAGREEMENT
           SUM CLAIMED          $58
           SUM APPROVED         $62
WITHDRAWAL WITH CARD AND BANK BOOK
ACCOUNT NO. 1 2 3 4 5 6 7 8 9

INQUIRE AT CENTER
```

FIG.37

```
CTR = 8            MTC = 447
CASH TRANSPORT ERROR    S5 - S6   JAMMING
SUM TO BE DISPENSED     $58
                        $50...1      $1...8
WITHDRAWAL WITH CARD AND BANK BOOK
ACCOUNT NO. 1 2 3 4 5 6 7 8 9

CENTER FILE RENEWED     DISPENSE $58
INITIAL RESET NEEDED
```

SYSTEM FOR PERFORMING TRANSACTIONS

BACKGROUND OF THE INVENTION

1. Field of the Invention

This invention relates to a banking transaction performing system which includes an input unit to be operated by a customer and which enables the customer to perform any desired one of banking transactions, such as depositing, cash dispensing, balance reference, bank book entry, funds transfer and cash exchange, by following a specified procedure comprising a plurality of steps in sequence with use of the input unit.

2. Description of the Prior Art

Since such transaction performing systems handle magnetic cards having information of customers magnetically recorded therein, bank books and bank notes, various malfunctions, errors and like troubles are likely to occur in the steps of reading, printing and transport involved. Accordingly these systems have incorporated therein means for detecting expected troubles, an indicator for giving notice on to the occurrence of troubles and input means, such as a reset switch, for restoring the system after the causes of troubles have have been eliminated.

Further to assure accurate operation for transaction performing systems at all times, there is the need to conduct operation tests frequently. Examples of operation tests are card or bank book reading test, writing test, bank note discriminating test, etc. The system is equipped with switches for performing operation tests and specifying the desired operation test. However, conventional systems are not provided with a particular output device for giving the result of operation tests.

Transaction performing systems are further provided with switches for changing the operation mode, such as a switch for alternatively selecting one of on-line mode and off-line mode and a switch for changing the usual operation mode to the above-mentioned test mode, and also with setting means or input switches, such as a date setting means or a switch for giving instructions for totaling or accumulating transaction data.

The input means to be operated by the bank teller or clerk, such as the above-mentioned trouble indicator, reset switch, test specifying switches, mode changing switches, various setting means and instruction switches are all provided on an inner panel, which is usually disposed inside the front lower portion, side portion or rear portion of the system, with a door provided in front of the inner panel. Accordingly when the clerk is to manipulate the desired means, he must invariably open the door of the inner panel. This is vey cumbersome for the clerk. Further if the clerk opens the door in the event of a malfunction occurring, the inner panel becomes visible for the customer. This is not desirable from the standpoint of the prevention of crimes. The system would appear more attractive without the door.

The amount of information that can be shown on the trouble indicator on the inner panel is greatly limited, since a large number of switches and setting means are arranged on the inner panel, making it impossible to use a large space for the indication of troubles. For this reason, the information which can be shown on the trouble indicator is limited to predetermined maintenance codes representing the causes of malfunctions. This means that in the event of a trouble taking place, the clerk must decode the maintenance code before following the procedure of remedying the trouble in order to understand the cause of the malfunction.

Furthermore, since the inner panel is not provided with any output device for giving the results of operation tests as described above, the clerk is unable to know the result of the test conducted. Thus the operation test is not fully significant.

SUMMARY OF THE INVENTION

An object of the present invention is to provide a transaction performing system which does not require any inner panel, enables the clerk to execute various processes without using any inner panel and is therefore convenient and simple for the clerk to operate, the system further having a desirable construction in appearance and for the prevention of crimes.

Another object of the invention is to provide a transaction performing system which, upon occurrence of a malfunction, shows the cause of the trouble and provides instructions to the clerk in the form of a message so that the clerk is able to quickly and properly take the necessary measures for the remedy of the trouble to restore the system without the necessity for the clerk to decode any maintenance code.

Still another object of the invention is to provide a transaction performing system which, when tested for operation, is capable of affording the test result and, when required, information relating to the error which has occurred during the testing.

A further object of the invention is to provide a transaction performing system of simplified construction.

The transaction performing system of this invention is adapted to execute a predetermined transaction when the customer follows a plurality of steps in sequence. The system comprises an electronic visual display unit at least capable of showing alphanumeric characters, a memory for storing the codes representing the messages to be shown on the display unit, first means for customer processing to control display of information for the customer on the display unit, and second means for clerk processing to control display of information for the clerk on the display unit. Preferably the electronic visual display unit is one which is capable of showing not only characters but also illustrations at the same time. Examples of useful display units are a cathode-ray tube display, plasma display, display incorporating liquid crystals, display comprising a multiplicity of electroluminescent elements, such as light-emitting diodes, arranged in rows both horizontally and vertically, etc. It is preferred that for the benefit of the customer performing a transaction, the display unit show an instruction comprising the combination of a procedure specifying textual message describing the procedure to be followed by the customer and simultaneously a procedure specifying graphic illustration to pictorially depict the physical enactment of the procedure in corresponding relation to the message. This eliminates the need for an operation procedure indicator for the customer to simplify the construction of the system.

The transaction performing system further comprises a plurality of function buttons arranged in the vicinity of the display unit. The display unit shows a term indicating the function of the function button at a location adjacent and corresponding to the button and also shows a button frame surrounding the function indicating term at least at two sides thereof for manifestly associating the term with the button. For the customer processing and also for the clerk processing, the function button is useful as a switch for the customer or the clerk to enter the desired data, instruction or the like. For the clerk processing, for example, a plurality of function indicating terms representing the processing items to be executed by the clerk and function indicating terms representing operation test codes are shown in close association with the function buttons, thereby permitting the clerk to select the desired processing item or test.

The transaction performing system of the invention is further provided with a clerk key for the clerk to actuate. The input given by this actuation by the clerk clearly distinguishes the customer processing from the clerk processing.

When the system has detected a malfunction, the display unit shows the cause of the detected trouble and provides instructions to the clerk in the form of a message. This enables the clerk to quickly and properly taken measures to remedy the trouble to restore the system. When the system is tested for operation, the display also shows the test result.

In this way, the function buttons arranged in the vicinity of the display unit are used as switches for the clerk to enter data or instructions. Furthermore the display unit shows the functions of the function buttons, indicates the causes of troubles, provides instructions to the clerk when troubles have occurred, and also gives test results. Thus the display unit and the function buttons serve all the functions that otherwise would be performed by an inner panel and therefore the present invention will eliminate the necessity for the inner panel.

The present invention wil become more apparent from the following embodiments described with reference to the accompanying drawings and adapted for use as banking transaction systems.

BRIEF DESCRIPTION OF THE DRAWINGS

FIG. 21 shows another example of button frames;

FIG. 22 is a flow chart showing an overall process procedure for the banking transaction system;

FIGS. 23a–23j are a flow chart showing procedures for clerk processing;

FIGS. 24a and 24b are a flow chart showing error treating procedures;

FIGS. 27 to 35 show various examples of displays on the CRT to be given for clerk processing including test procedures and trouble treatment;

FIGS. 36 and 37 show other examples of displays on the CRT to be given when troubles have occurred.

DESCRIPTION OF THE PREFERRED EMBODIMENTS

Figure 1:
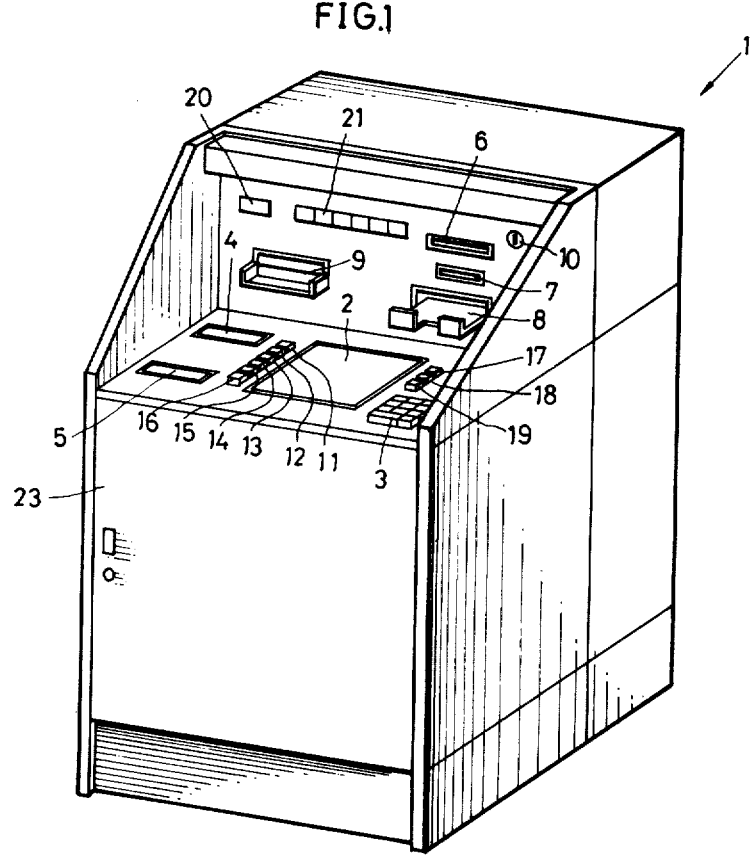
FIG. 1 is a perspective view showing the appearance of a banking transaction system.

FIG. 1 shows the appearance of a banking transaction system 1 for performing transactions, such as depositing, cash dispensing, balance reference, bank book entry, funds transfer and cash exchange. The system 1 has a forwardly projecting, horizontal customer operation panel provided with a cathode-ray tube display (Braun tube, hereinafter referred to as "CR") 2 for showing instructions comprising procedure specifying textual messages and procedure specifying graphic illustrations in combination therewith, codes or messages showing troubles developed or causes thereof and instructions to the bank clerk, results of operation tests, terms indicating the functions of function buttons 11 to 19, frames for manifestly indicating which of these terms is associated with each of these buttons, amounts of cash to be dispensed, and other input data or information. The display screen of the CRT 2 is covered with protective glass. The function buttons 11 to 16 and 17 to 19 are aligned along the opposite sides of the CRT 2 at locations adjacent thereto. The function buttons 11 to 19 are used for entering information such as the desired transaction selected, cancellation, confirmation, unit of money, selected kind of bank note and items to be processed by the banking personnel or clerk. Disposed at the right of the CRT 2 close to the front side of the panel is a ten-key keyboard 3 for keying in such information as an ID number for identifying the customer, the amount of cash to be dispensed, date, etc. The operation panel is further formed with a cash inlet 4 for inserting bank notes and a cash return outlet 5 for returning bank notes. When bank notes are inserted for depositing but the transaction is cancelled before completion, the notes placed in are returned to the outlet 5. Preferably the function buttons 11 to 19 and keys 3 are made from pressure-sensitive electroconductive rubber, whereby the buttons and keys can be made thinner, positioned closer to the CRT 2, and rendered easier to operate and more compact.

The system 1 has a vertical operation panel formed at the right-hand side thereof with a key 10 for the bank clerk, an inlet 6 for inserting a magnetic card having magnetically recorded therein specific data, such as a personal identification code, relating to the customer eligible for banking transactions, an outlet 7 for delivering a receipt having printed thereon the data of a transaction performed without using any bank book, and a cash outlet 8 for delivering the bank notes to be dispensed. On the left side, the vertical panel has an inlet 9 for inserting a bank book, an operation indicator 20 disposed above the bank book inlet 9 for indicating that the system 1 is in condition for transactions, and a service indicator 21 similarly disposed for indicating the kinds of transactions to be carried out.

Figure 2:
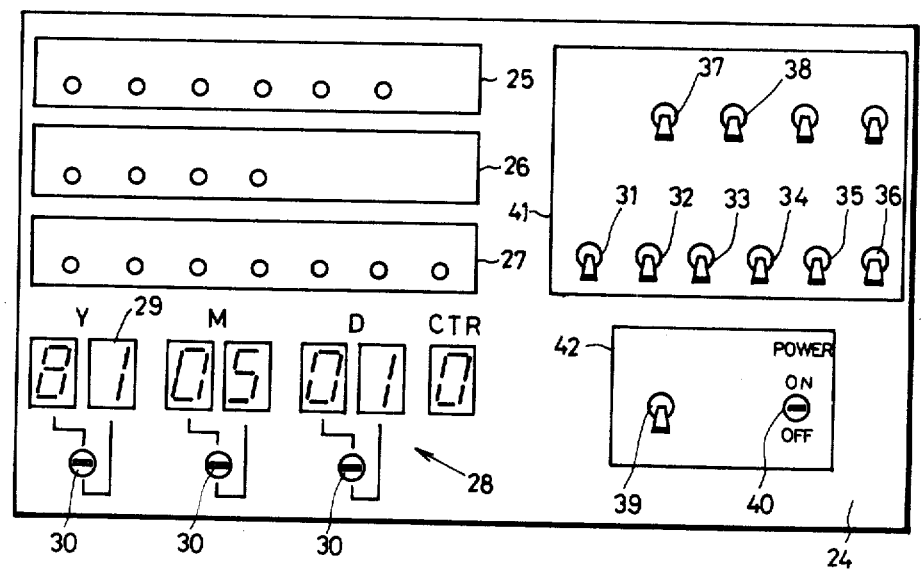
FIG. 2 is a front view of an inner panel.

The banking transaction system 1 has a door 23 at the lower portion of its front side. An inner panel 24 is disposed inside the door 23. Although ultimately dispensable to this invention, the inner panel 24 is provided for the present embodiment for a better understanding of the invention. FIG. 2 shows the appearance of the inner panel 24, which is provided with various indicators 25, 26, 27, groups of manual switches 41, 42 and date setting means 28. The indicator 25 shows states of the system 1, such as the power supply turned on, the system 1 in condition for transactions, the system 1 in communication with the center, etc. The indicator 26 indicates some procedures to be followed by the bank clerk, such as the need for a supply of bank notes or receipt sheets and the need for collection of bank notes. The indicator 27 indicates input and output means individually when they are at fault as will be described later.

The group of manual switches 41 include a line mode switch 37 for selecting on-line mode or off-line mode, a switch 38 for selecting a test operation or usual transaction operation, switches 31 and 32 for starting totaling and subtotaling, a switch 33 for testing cash releasing, a communication switch 34, a reset switch 35 and a continued processing switch 36. As apparent from the description given later, the terms "totaling" and "subtotaling" refer to the totaling of transaction data and printing of the result, with the memory cleared of the data stored in the former case, and without clearing in the latter case. The term "contd" refers to the continued transaction processing by the system 1 in the event of a trouble taking place, followed by processing by the bank clerk. The group of switches 42 include a remote control switch 39 and a power supply switch 40.

The date setting means 28 comprises a date indicator 29 and number switches 30 and is used also for entering test codes. The number switches 30 are provided for the numbers of two figures representing the year Y, month M and day D, one switch for each number. If the switch 30 is turned up, the number of the second figure is advanced by one, and if it is turned down the number of the first figure is advanced by one. When the test/usual switch 38 is set for the usual transaction, the switches 30 are used for setting the date, while if the switch 38 is set for test, the switches 30 are used for entering test codes. Designated at CTR at the right of the data indicator 29 is an indicator for a progress indicating counter.

Figure 3:
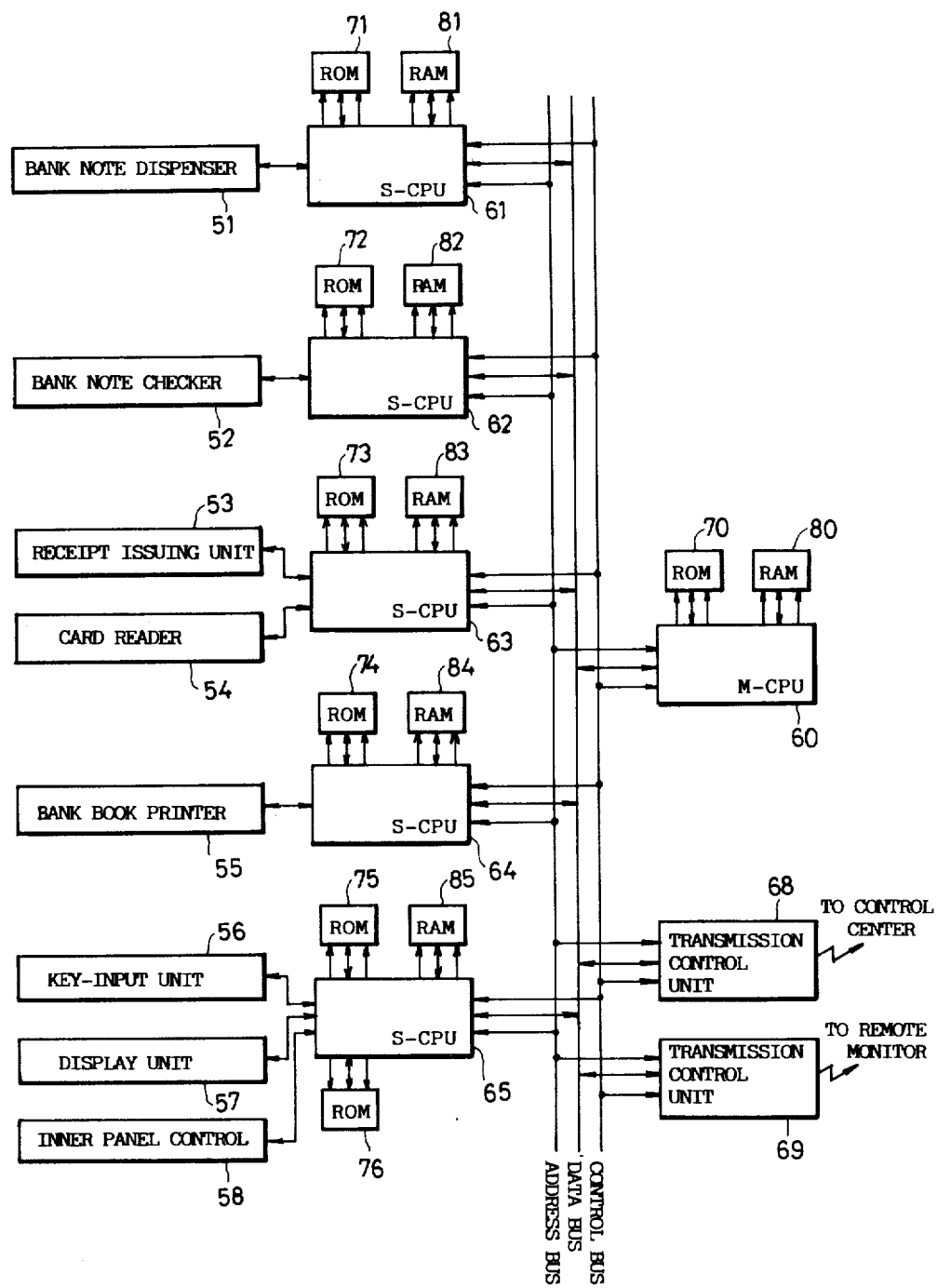
FIG. 3 is a block diagram showing the interior circuit construction of the system.

FIG. 3 schematically shows the interior construction of the banking transaction system 1. The system is provided as input/output units with a bank note dispenser 51 for counting and transporting bank notes in a sum specified for cash dispensing as well as for cash exchange and delivering the notes to the outlet 8 in response to a "confirm" signal from the function button 18 (see FIG. 19), a bank note checker 52 for verifying that the bank notes inserted into the cash inlet 4 are genuine and discriminating the kinds of the notes, a receipt issuing unit 53 for recording on a journal for the bank the data of each transaction, such as the kind of transaction, the amount or sum of cash dispensed or deposited, etc., and also for delivering a receipt to the customer, a magnetic card reader 54 disposed inside the card inlet 6 for reading the data magnetically recorded in the card, a bank book printer 55 for printing on the book the data of transaction, the amount of cash dispensed or deposited, balance and other data, a key-input unit 56 including the function buttons 11-19 and the keyboard 3, a display unit 57 including the CRT, and a control 58 for the inner panel 24. The receipt may be issued from the bank book printer 55. The banking transaction system 1 is controlled by a master slave system comprising a master central processing unit (hereinafter referred to as "M-CPU") 60 and a plurality of slave central processing units (termed "S-CPU") 61 to 65 for carrying out various transactions. Preferably such CPU's are microprocessors. The bank note dispenser 51 is controlled by the S-CPU 61, the bank note checker 52 by the S-CPU 62, the receipt issuing unit 53 and the card reader 54 by the S-CPU 63, the bank book printer 55 by the S-CPU 64, and the keyinput unit 56, the display unit 57 and the inner panel control 58 by the S-CPU 65. The M-CPU 60 and the S-CPU 61 to 65 are provided with read-only memories (ROM) 70 and 71 to 75 having stored therein their programs and also with random access memories (RAM) 80 and 81 to 85 for storing various transaction data, respectively. The S-CPU 65 for controlling the display unit 57 is provided with a message illustration code memory 76 for storing codes representing predetermined procedure specifying textual messages and procedure specifying graphic illustrations to enable the CRT 2 to present various displays. The M-CPU 60 and S-CPU 61 to 65 are interconnected by an address bus, data bus and control bus. An unillustrated control center has a customer information file having stored therein customer's personal codes, banking transaction data, etc. By way of a transmission control unit 68, the M-CPU 60 delivers transaction processing data to the control center, from which data permitting or rejecting a particular transaction and the transaction data renewed by the control center are fed to the M-CPU 60 via the unit 68. The states and troubles of the system 1 that will be shown on the inner panel 24 are also shown on a remote monitor (not shown). The communication between the monitor and the M-CPU 60 is effected by way of a transmission control unit 69. These transmission control units 68 and 69 include a line controller, modulator-demodulator, etc.

Figure 4:
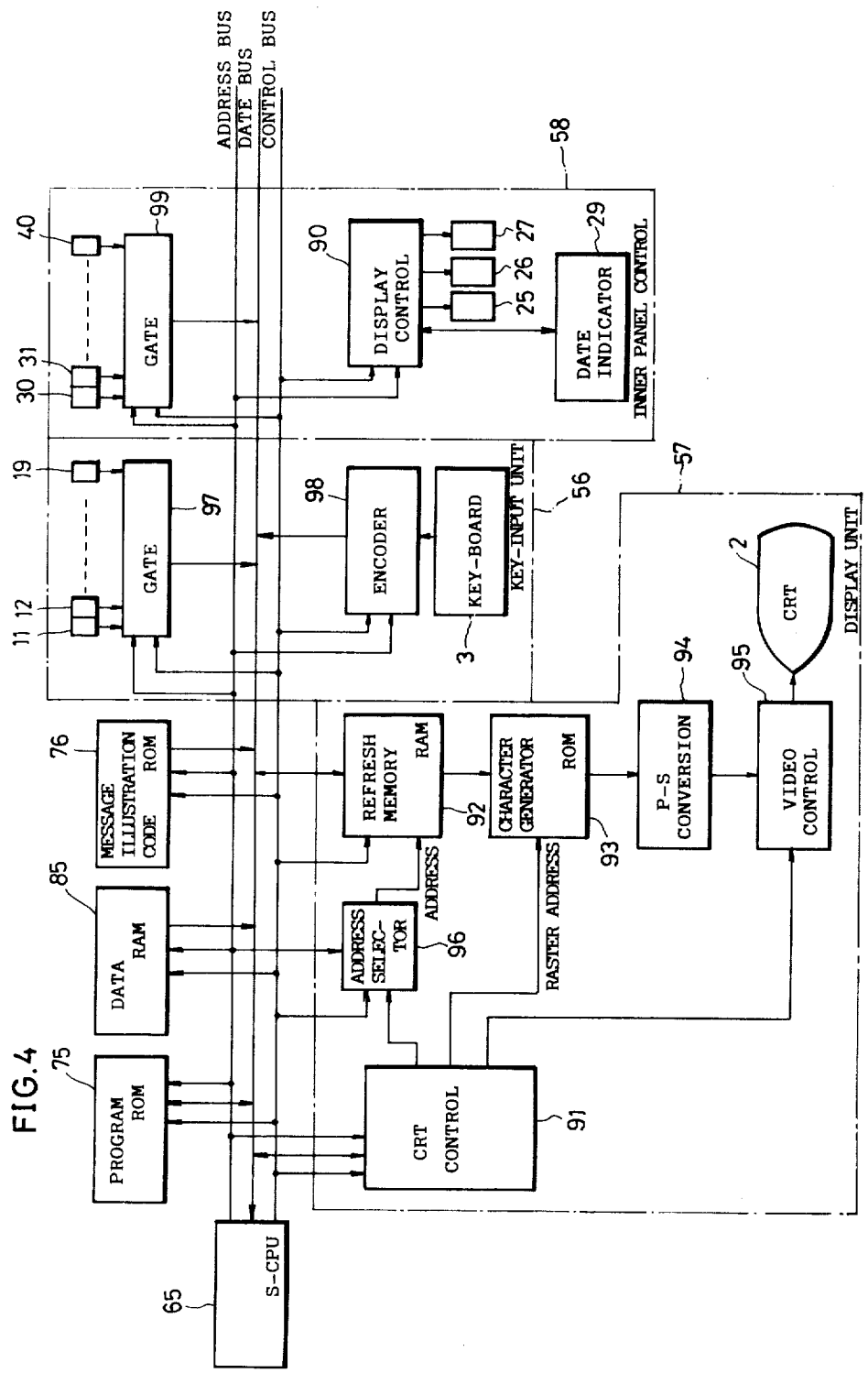
FIG. 4 is a block diagram showing a display unit, key-input unit and inner panel control of the system in detail.

FIG. 4 shows the constructions of the key-input unit 56, display unit 57, inner panel control 58, etc. in greater detail. The key-input unit 56 comprises the function buttons 11-19, a gate 97 for feeding the output signals from the function buttons 11-19 to the S-CPU 65, the keyboard 3 and an encoder 98 by which the data entered by the keyboard 3 are converted and delivered to the S-CPU 65. The gate 97 permits the passage of the output signals of only the function buttons selected by the S-CPU 65. The display unit 57 comprises a CRT control unit 91, refresh memory 92, character generator 93, parallel-serial converter 94, video control unit 95 and address selector 96. The components of the display unit 57 will be described in greater detail later. The inner panel control 58 comprises switches 30-40, gates 99 therefor, indicators 25-27, data indicator 29 and a display control circuit 90 for these indicators.

Of the displays to be given on the CRT 2, those for the customer are shown in FIGS. 9 to 20 for illustrative purposes. As will become apparent from these drawings, such displays comprise one or more of the following a procedure specifying textual message, a procedure specifying graphic illustration, terms indicating the function of the function buttons, button frames, and confirmation data.

Examples of procedure specifying messages are:
WELCOME TO OUR CONVENIENCE BRANCH.
PRESS ONE BUTTON FOR DESIRED SERVICE.
CASH IS WITHDRAWABLE WHEN YOUR CARD IS INSERTED WITHOUT PRESSING BUTTON. (FIG. 9)
INSERT YOUR CARD IN THE DIRECTION OF ARROW. (FIG. 10)

INSERT YOUR BANK BOOK, OR
KEY IN YOUR ID NUMBER WHEN NOT USING BANK BOOK. (FIG. 11)
KEY IN YOUR ID NUMBER. (FIG. 12)
KEY IN AMOUNT OF CASH FOR WITHDRAWAL. (FIG. 13)

Exemplary of procedure specifying graphic illustrations are the following.

Figure 9:
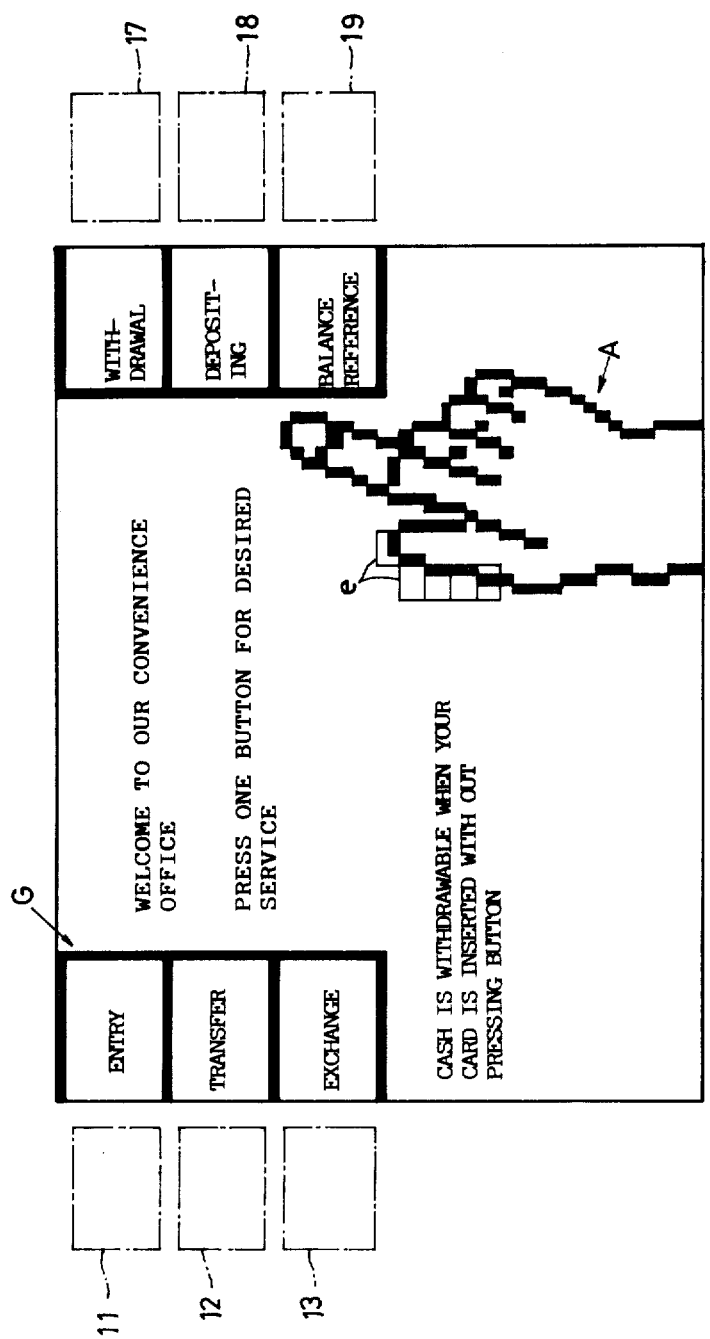
FIGS. 9 to 20 show various examples of displays on the CRT for customer processing.
Figure 10:
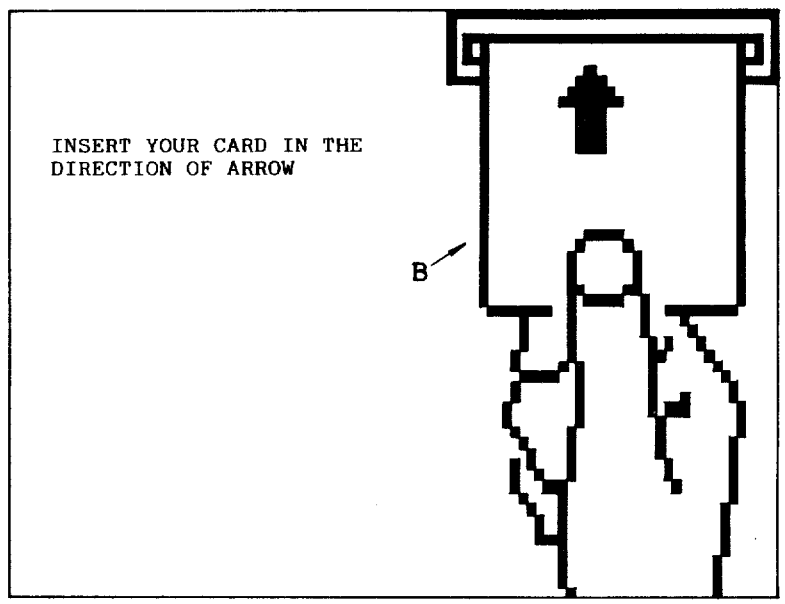
Figure 19:
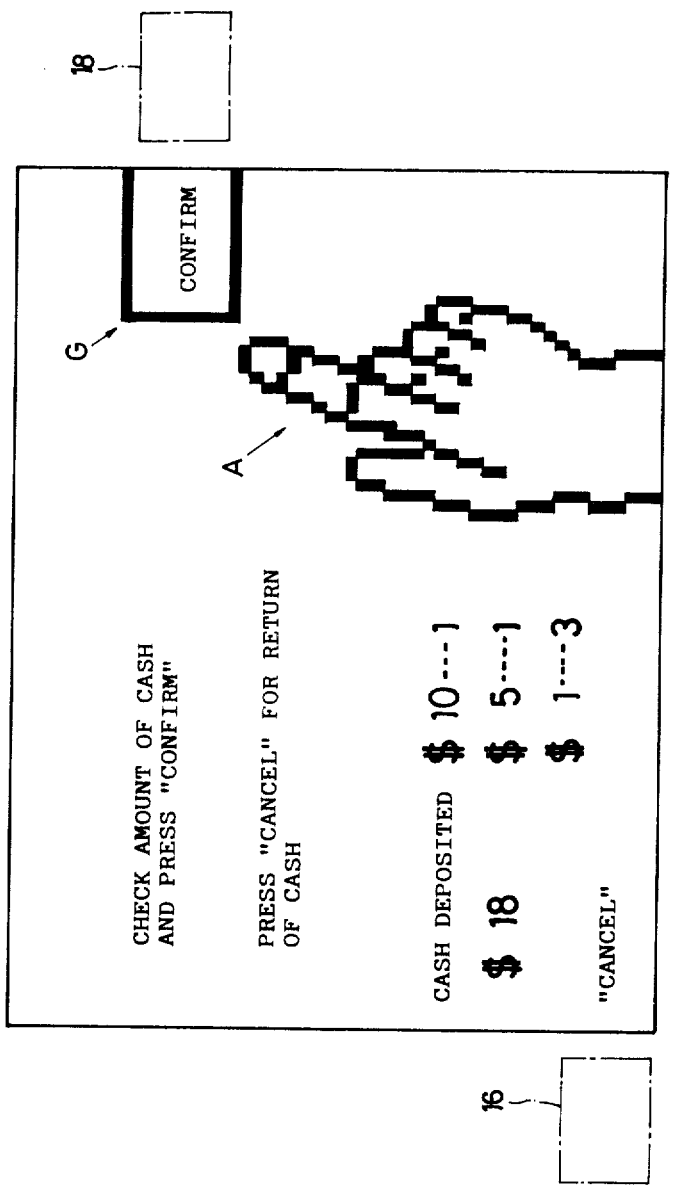

An illustration pictorially depicting the finger of the customer depressing one of the function buttons for selecting the desired transaction or confirming the sum (indicated at A in FIG. 9 or 19).

Figure 15:
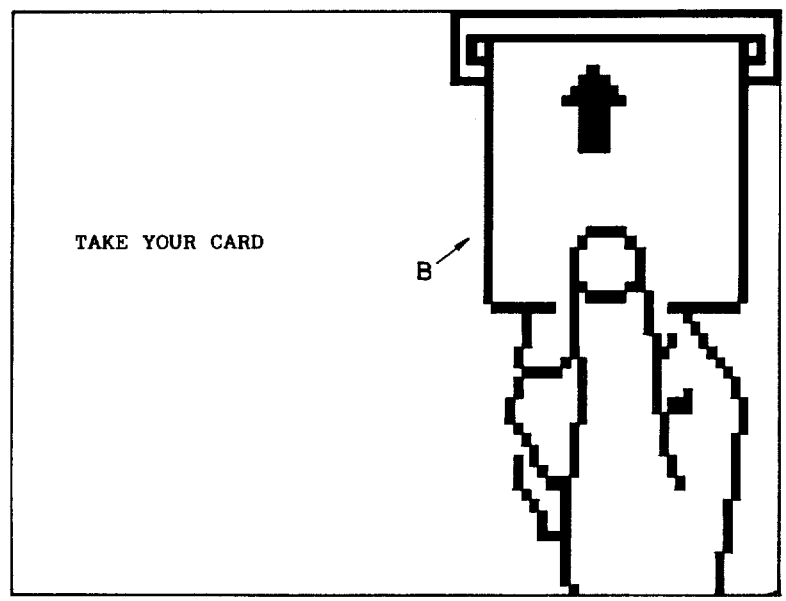

An illustration pictorially depicting the action of the customer inserting or taking up the card (indicated at B in FIG. 10 or 15).

Figure 11:
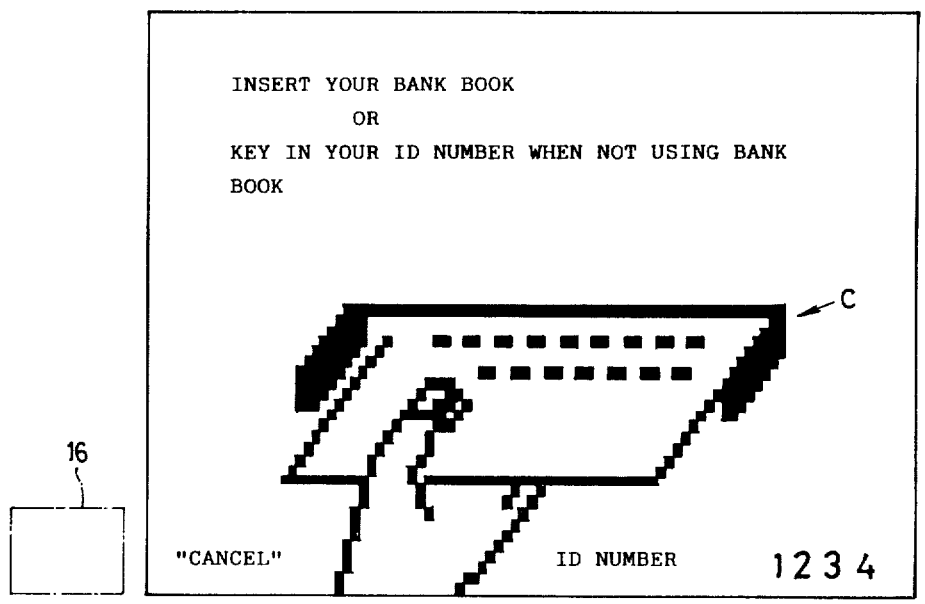
Figure 16:
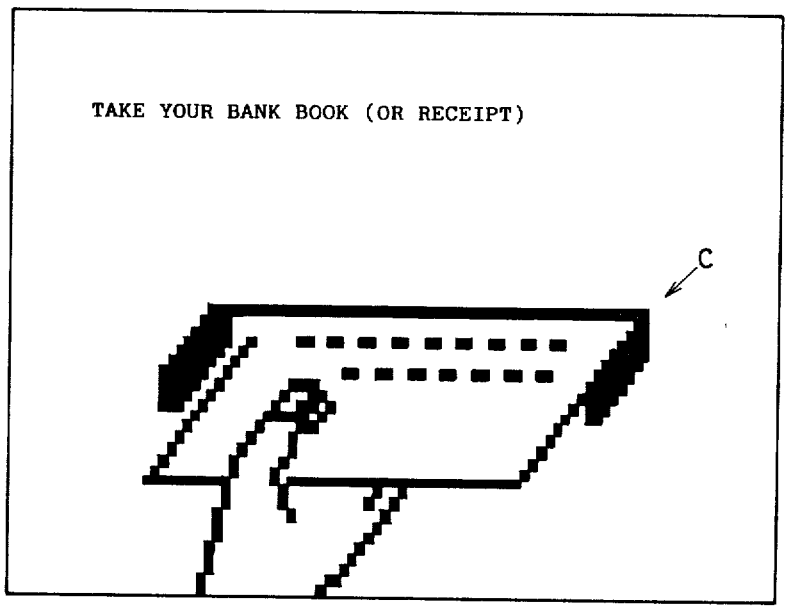

An illustration depicting the customer inserting or withdrawing the bank book (designated at C in FIG. 11 or 16).

Figure 12:
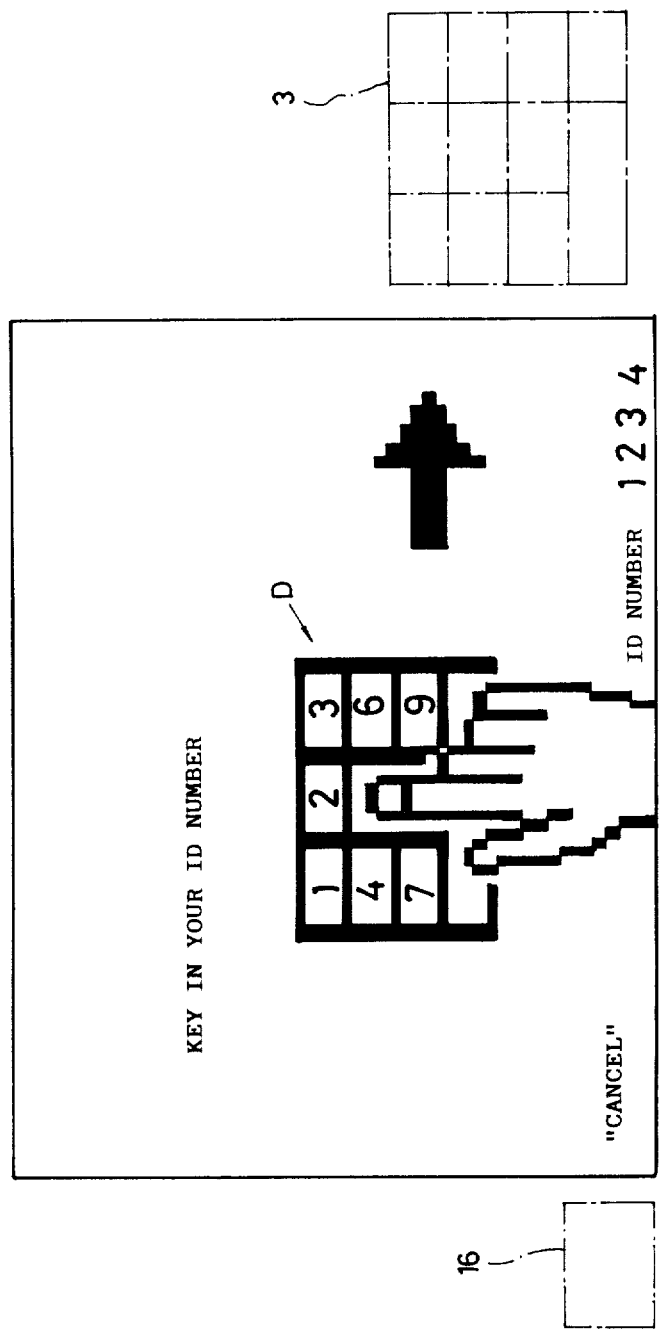
Figure 13:
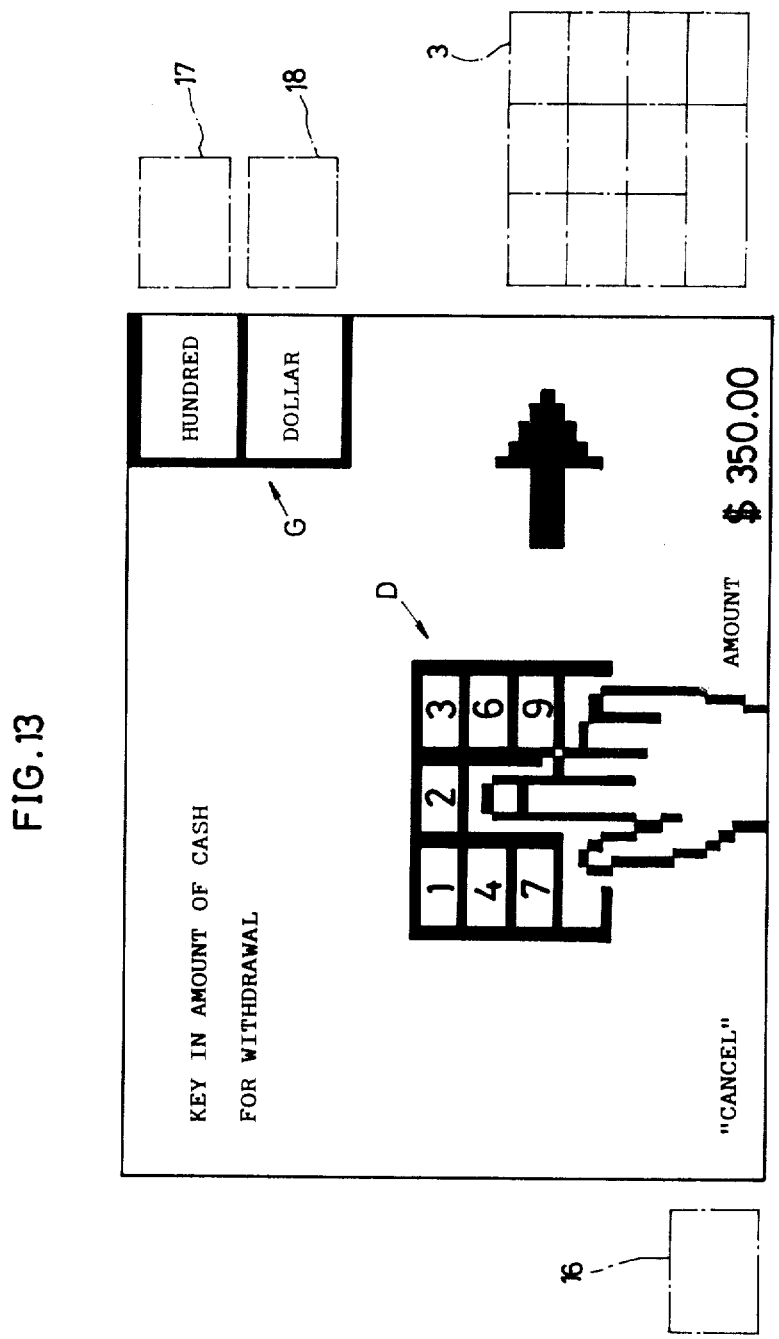

An illustration depicting the customer entering by the keyboard his ID number or the sum to be withdrawn (designated at D in FIG. 12 or 13).

Figure 17:
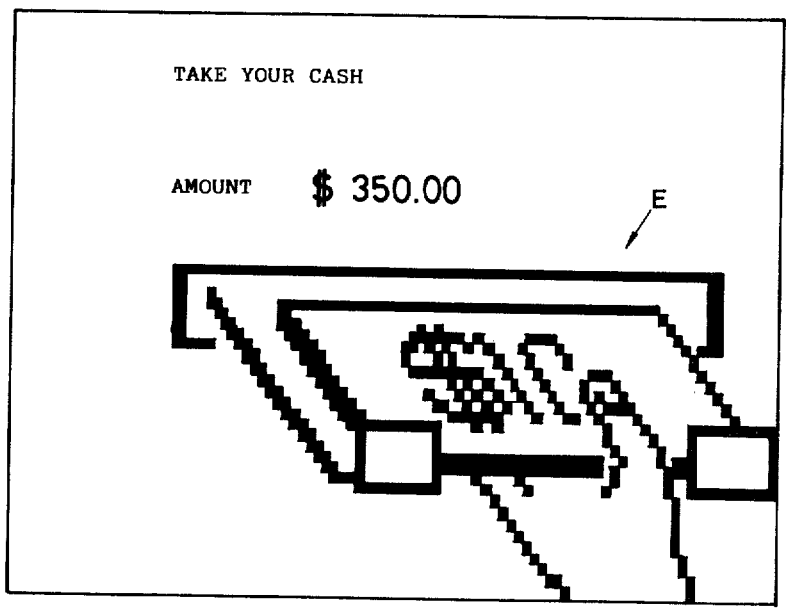

An illustration depicting the customer receiving the cash (designated at E in FIG. 17).

Figure 18:
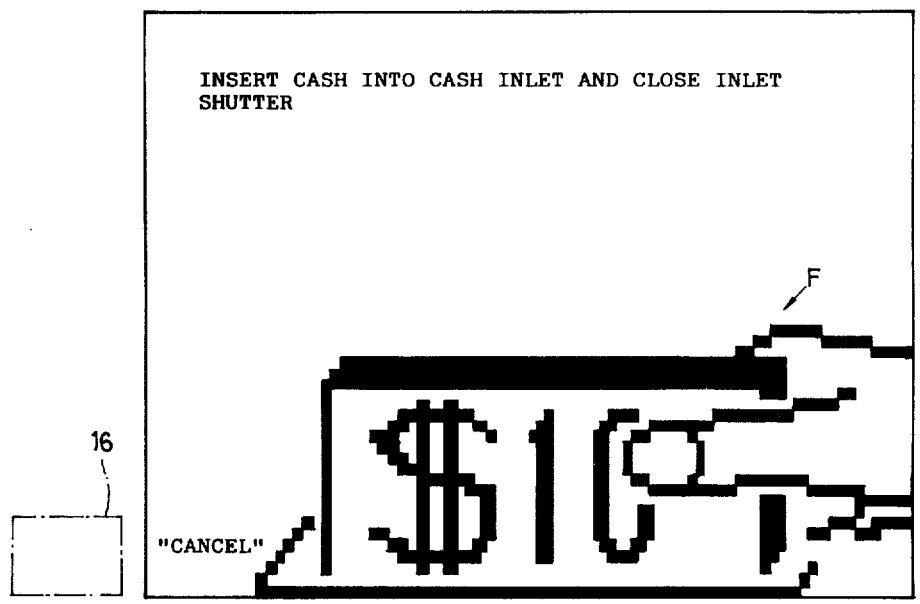
Figure 20:
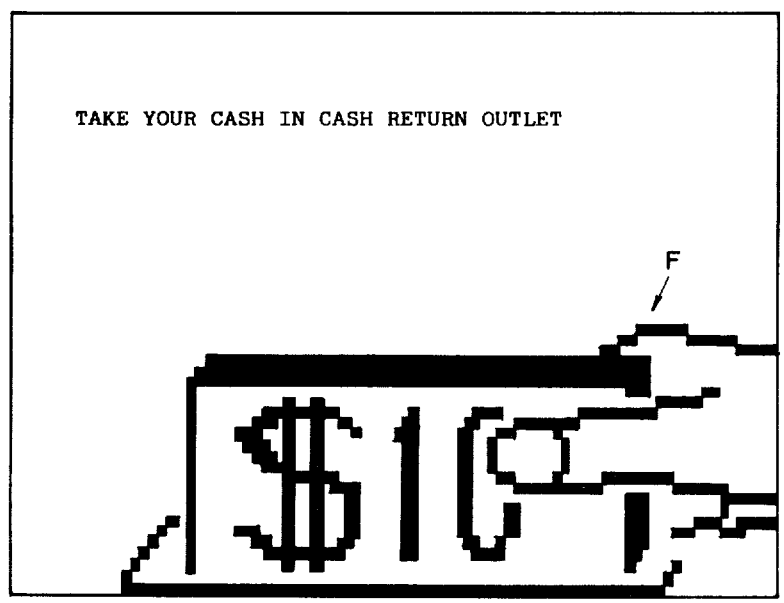

An illustration depicting the customer inserting or receiving bank notes (designated at F in FIG. 18 or 20).

The function indicating terms showing the functions of the function buttons are displayed at locations adjacent the corresponding function buttons. When the customer is required to specify the desired transaction, the terms, ENTRY, TRANSFER, EXCHANGE, WITHDRAWAL, DEPOSITING and BALANCE REFERENCE are displayed in corresponding relation to the buttons 11–13 and 17–19 (FIG. 9). When the customer is to key in the sum to be withdrawn, the terms HUNDRED and DOLLAR are displayed in corresponding relation to the buttons 17 and 18 (FIG. 13). For example, when the sum to be dispensed is 350 dollars, the customer depresses the number 3 on the keyboard 3 first, then the button 17, thereafter the numbers 5 and 0 on the keyboard 3 in succession, and finally the button 18. For depositing, the sum of bank notes inserted into the inlet 4 is displayed on the CRT 2. For the customer to confirm that the displayed sum is in agreement with the sum of bank notes inserted, the customer uses the function button 18, the function of which is shown with the term "CONFIRM" displayed adjacent to the button 18 (FIG. 19). In addition, function buttons are used for the exchange of money for specifying the face value of notes desired by the customer, such as 1-dollar note, 2-dollar note and 5-dollar note. In this case, terms indicative of the face value of such notes are used as function indicating terms.

The button frames are those indicated at G in FIGS. 9, 13 and 19 and surrounding the function indicating terms to manifestly show which buttons correspond to the terms. The button 16 is used by customers for cancellation only (FIG. 11 etc.) In the present embodiment, the term "CANCEL" indicating the function of the button 16 is not provided with any button frame. As seen in FIG. 21, the button frame G may surround the term at least at two sides thereof.

Confirmation data are, for example, the sum of bank notes inserted, face value of notes, number of notes, etc. as shown in FIG. 19.

The procedure specifying message, as well as the function indicating term, is composed of characters, such as letters and numerical figures. The character is shown on the screen of the CRT 2 as an assembly of bright dots. The character generator 93 produces an assembly of dots representing a character from a code representing the character. Similarly the procedure specifying graphic illustration, as well as the button frame, is composed of various elements e (to be referred to as "picture elements" for convenience) in combination, as shown in FIG. 9 for illustrative purposes. The picture element 3 is also shown as an assembly of bright dots on the screen of the CRT 2. The assembly of dots forming the picture element is produced also by the character generator 93.

Figure 5:
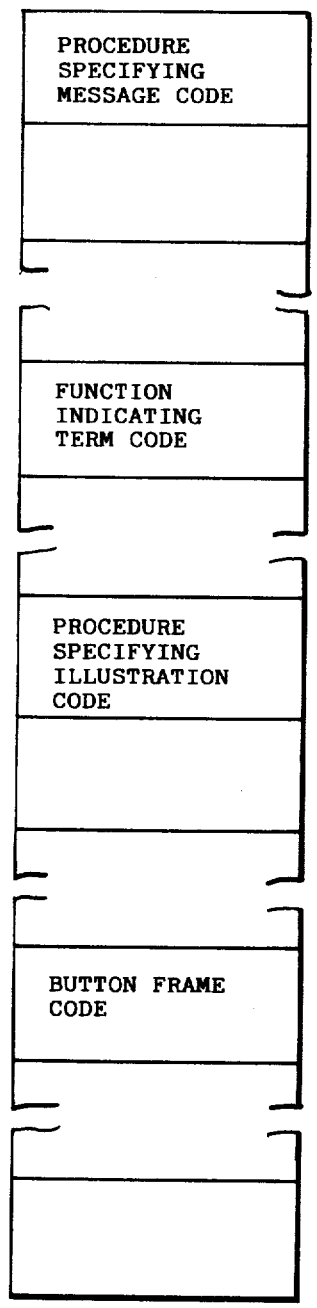
FIG. 5 shows the contents of message, term and illustration code memories.

FIG. 5 shows the contents of the message illustration code memory 76. Since the procedure specifying messages and function indicating terms are each composed of an assembly of characters, the memory 76 has stored therein the position (address) of each of the messages and terms on the screen of the CRT 2 and the codes of the characters constituting the same in the same order as in the message (or term). The same is true of the procedure specifying illustrations and button frames; the memory 76 has stored therein the position (address) of each of the illustrations and frames on the screen of the CRT 2 and the codes of the picture elements constituting the same in a specific order.

When the M-CPU 60 gives an instruction to the S-CPU 65 for producing a display or image, the S-CPU 65 reads out the codes of the message (term) and/or illustration from the memory 76 in accordance with the instruction and stores the codes in the refresh memory 92. The refresh memory 92 includes a memory for storing the information for the first image and a memory for storing the information of the next image while the first image is on display. When the information of the first image has been stored, or is already stored, in the refresh memory 92, the CRT control unit 91 controls reading out of codes from the refresh memory 92 in response to an instruction from the S-CPU 65. The address selector 96 controls the refresh memory 92 in respect of the addresses for storing codes therein and reading out codes therefrom. Based on a code readout from the refresh memory 92, the address of an assembly of dots stored in the character generator 93 is specified. The CRT control unit 91 also feeds raster address signals to the character generator 93, which in turn generates dot signals representing characters or picture elements. The parallel-serial converter 94 converts the signals to serial video signals, which are fed to the video control unit 95. The unit 95 scans the video signals horizontally and vertically. The CRT control unit 91 reads out codes from the refresh memory 92 to bring the raster address signals into synchronism with the scanning of the video signals.

Figure 6:
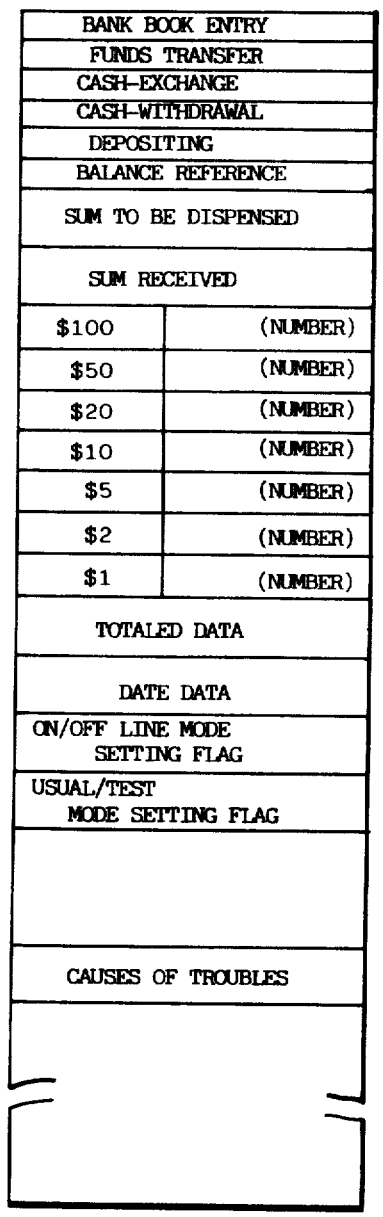
FIG. 6 shows the contents of RAM.

FIG. 6 shows the contents of the RAM 80 for storing data. The RAM 80 has an area for storing the kinds of transactions specified by the function buttons 11–13 and 17–19, an area for storing the sum to be dispensed, an area for storing the sum of the bank notes inserted through the cash inlet 4, an area for storing the number of each kind of the bank notes inserted, an area for storing totaled data of transactions, an area for use as a flag for setting on-line or off-line mode, an area for use as a flag for setting usual or test mode, and an area for storing codes of the causes of troubles.

Figure 7A:
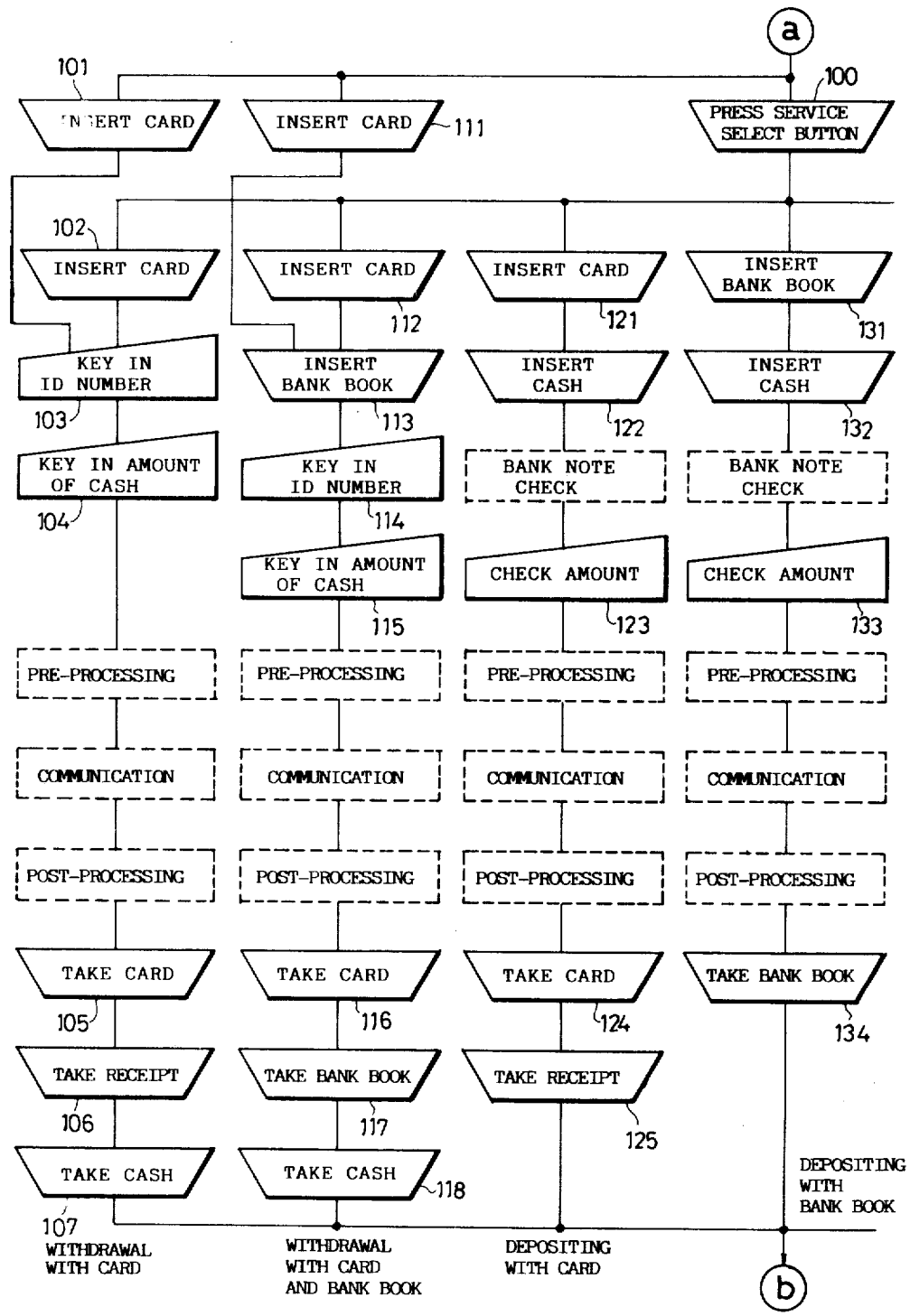
FIGS 7a and 7b are a flow chart showing the procedures to be followed by the customer for performing transactions with use of the system.
Figure 7B:
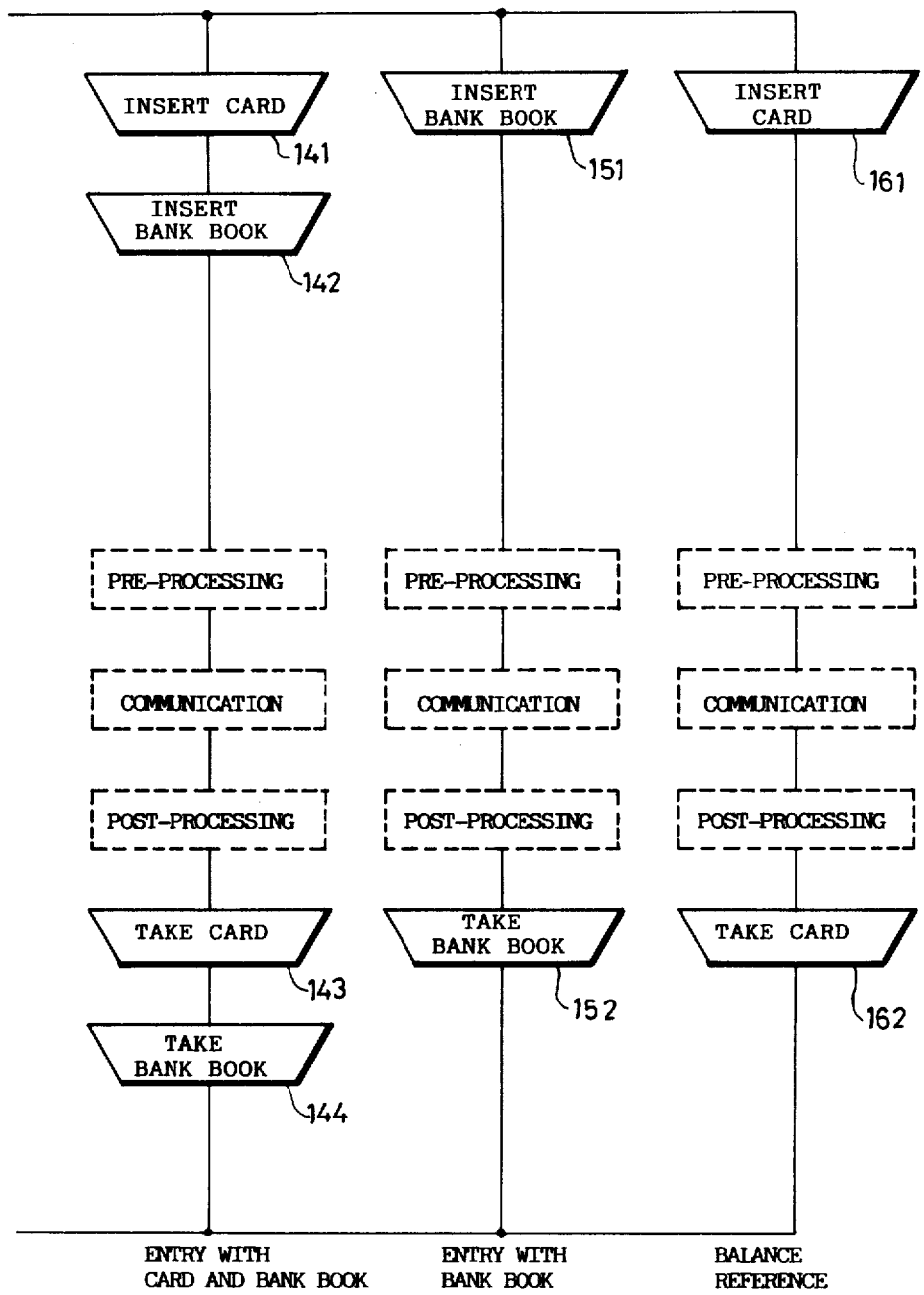

FIG. 7 shows the procedures to be followed by the customer for cash withdrawal, each depositing, bank book entry and balance reference. The procedures for funds transfer and cash exchange are not shown. With use only of a card magnetically recording the personal code, etc., cash is withdrawn through steps 101 or 102 to 107. Steps 111 or 112 to 118 are for withdrawing cash with use of the card and a bank book. Steps 121 to 125 are for depositing with the card only, while steps 131 to 134 are for depositing with use of the bank book only. Usually the bank book has a magnetic strip affixed to its rear cover and recording the personal code and other data as is the case with the card, so that transactions can be executed with use of the bank book only. Steps 141 to 144 are for bank book entry with card and bank book. Steps 151 and 152 are for bank book entry with the bank book only. The term bankbook entry means printing of unrecorded new information on the bank book. Steps 161 and 162 are for balance reference with use of the card. When the card is inserted without selecting the desired transaction by the function buttons 11-13 and 17-19 (steps 101 and 111), cash is withdrawable.

Cash is withdrawn in the following manner using the card and the bank book. The customer depresses the function button 17 to specify withdrawal (step 100), and inserts the card into the inlet 6 (step 112). Alternatively the card is inserted without pressing the service select button (step 111). The customer then inserts the bank book into the inlet 9 (step 113) and enters his ID number by the keyboard 3 (step 114). When the ID number recorded in the card agrees with the ID number entered, cash is withdrawable. Subsequently the customer keys in the amount of cash to be withdrawn by the keyboard 3 (step 116), whereupon the banking transaction system 1 prepares communication data including the personal code or account number read from the card and the sum to be withdrawn (preprocessing) and starts communication with the control center. Based on the customer information file, the control center checks whether the sum is below the deposit balance and renews the file. In response to a dispensing instruction from the control center, the system 1 counts bank notes and prints the transaction data on the bank book and a receipt (post-processing) and thereafter delivers the card to the inlet 6. The customer takes up the card (step 116). The customer withdraws the bank book subsequently delivered to the inlet 9 (step 117), and takes the cash delivered to the outlet 8 (step 118). When cash is withdrawn with use of the card only without inserting the bank book, the receipt is withdrawn (step 106) instead of the withdrawal of the book.

The transaction of depositing includes the step (122 or 132) of inserting bank notes into the inlet 4 and the step (123 or 133) of checking whether or not the sum displayed on the CRT 2 is in agreement with the sum of the cash inserted. The system 1 checks the inserted bank notes for genuineness and face value with the bank note checker 52 and displays the amount of the inserted cash on the CRT 2.

For bank book entry and balance reference, the customer inserts the card (steps 141, 161), inserts the bank book (steps 141, 151), takes up the card (steps 143, 162) and withdraws the bank book (steps 144, 152), without inserting or receiving cash or without following other steps. For balance reference, the balance is displayed on the CRT 2.

Figure 8:
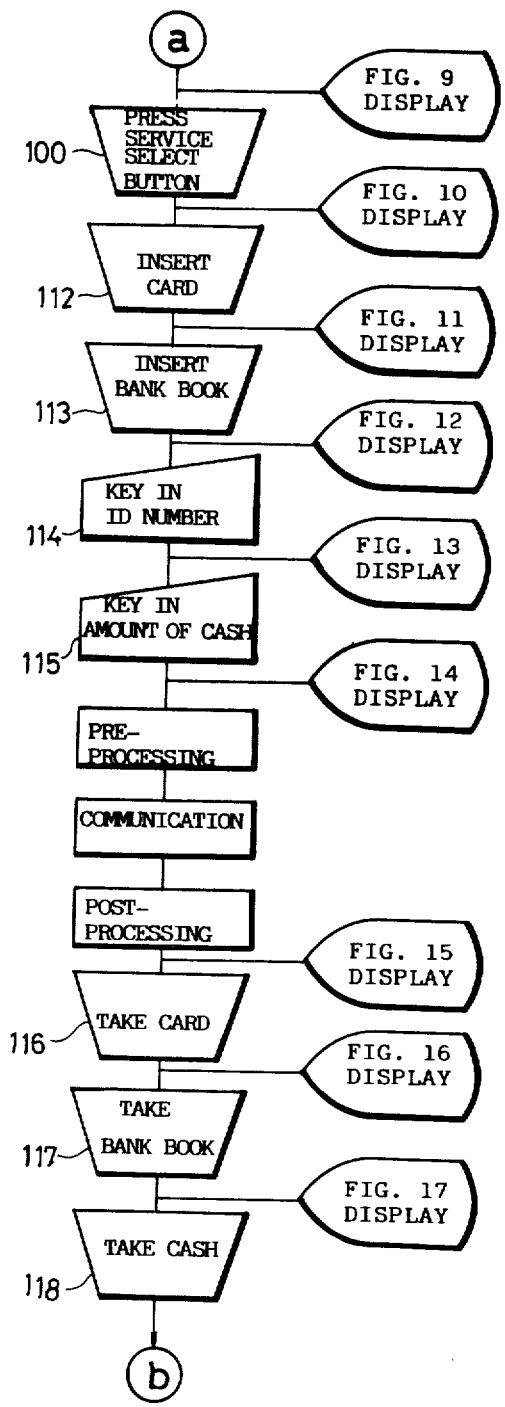
FIG. 8 is a flow chart showing a cash dispensing procedure with use of a card and a bank book to illustrate the relation between the steps to be followed by the customer and displays on a CRT.

FIG. 8 shows the procedure of cash withdrawal with use of the card and bank book to illustrate the relationship between the steps to be followed by the customer and the displays on the CRT 2. Before the transaction, the CRT 2 displays the image shown in FIG. 9. The CRT also displays the terms indicating the functions of the buttons 11-13 and 17-19 for selecting the desired service, at locations adjacent the corresponding buttons, and further displays the frames G to clearly show the relationship between the buttons and the corresponding terms. Additionally the CRT displays the textual message instructing the customer to select the desired service by pressing one button and also the graphic illustration A depicting the depression of the button. A message is also given to the effect that the cash dispensing service is selected when the card is placed in without pressing the button.

When the customer depresses the button 17 in accordance with the displayed instructions, the image on the CRT 2 changes to the one shown in FIG. 10. The screen now shows the message instructing the customer to insert the card and the illustration B depicting insertion of the card into the inlet.

Upon the insertion of the card into the card inlet 6, the CRT 2 displays the image shown in FIG. 11. FIG. 11 shows the message instructing the customer to insert the bank book and the illustration C pictorially depicting insertion of the book. Additionally, another textual instruction is also shown for entering the ID number by the keyboard 3 to withdraw cash with use of the card only without using the book. The ID number entered appears at the right lower corner of the screen.

Upon insertion of the book into the inlet 9, the image shown in FIG. 12 appears on the CRT 2. This image includes an instruction to enter the ID number and the graphic illustration D depicting this procedure. This illustration includes an arrow directed toward the keyboard 3, thus manifestly indicating the use of the keyboard. The ID number keyed in appears in the right lower corner of the screen.

When the ID number is entered, the image on the CRT 2 changes to the one shown in FIG. 13. The CRT 2 now displays the message instructing the customer to key in the sum of cash to be withdrawn and the above-mentioned illustration D. Since the function buttons 17 and 18 are used for entering the unit of the sum, the screen displays the terms "HUNDRED" and "DOLLAR" and button frames G surrounding the terms for the corresponding buttons. The amount of cash keyed in appears at the right lower corner of the screen. FIGS. 11 to 13 show the function indicating term "CANCEL" next to the function button 16.

Figure 14:
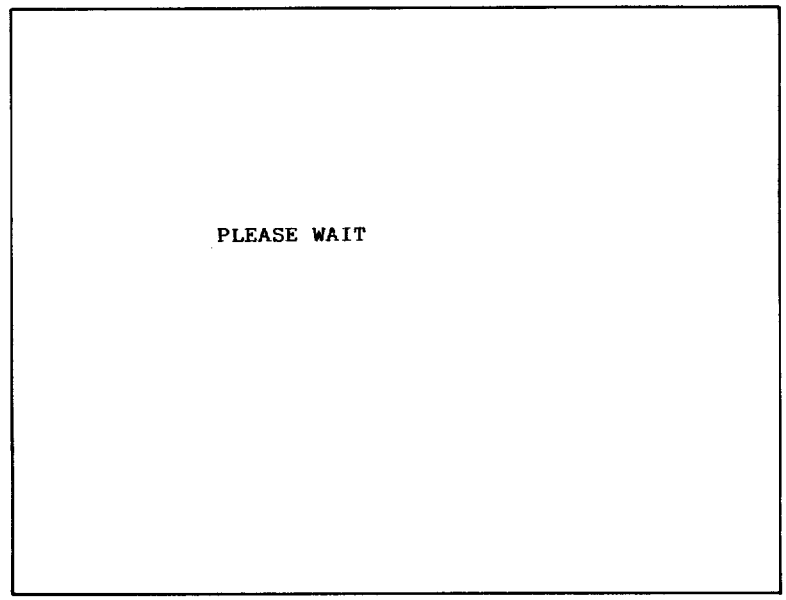

When the sum to be withdrawn is entered, the image on the CRT 2 changes to the one shown in FIG. 14. The image includes the instruction "PLEASE WAIT" since the system is in communication with the control center.

After the transaction data have been printed on the bank book and receipt following the communication with the control center, the CRT 2 shows the image of FIG. 15. The image includes the instruction to take up the card and the illustration B depicting withdrawal of the card.

When the customer takes up the card from the inlet 6, the image on the CRT 2 changes to the one shown in FIG. 16. The image comprises the message instructing the customer to take up the book or receipt and the illustration C depicting the withdrawal of the book.

Upon the withdrawal of the book or receipt from the inlet 9 or outlet 7, the CRT 2 displays the image comprising the message instructing the customer to take cash and the illustration E depicting the withdrawal of the cash from the cash outlet 8. The amount of the cash is also shown. (See FIG. 17.)

FIG. 18 shows a graphic image F depicting the customer inserting into the inlet 4 the cash to be deposited.

This image also includes the textual instruction message directing this procedure. Following this instruction, the customer places cash into the inlet 4 (steps 122, 132).

FIG. 19 shows an image instructing the customer to confirm the sum of cash inserted, in comparison with the result displayed affer the system has checked and counted the cash inserted. The image includes the textual message instructing the customer to press the "CONFIRM" button when the sum is in agreement with the count and the graphic illustration A depicting the depression of the button. The screen also shows the term "CONFIRM" indicating the function of the button 18 used for confirmation and disposed adjacent to the button 18 and the button frame G surrounding the term. The term "CANCEL" is also displayed adjacent to the function button 16. When the customer confirms the result by pressing the button 18, the transaction proceeds to the next step. Even if the customer depresses some button other than the buttons 16 and 18, this produces no influence on the transaction.

When the customer presses the "CANCEL" button 16, the image on the CRT 2 changes to the one shown in FIG. 20, and the cash placed in is delivered to the return outlet 5. The screen shows the message instructing the customer to take the cash in the outlet and the illustration F depicting withdrawal of the cash from the return outlet.

Figure 29:
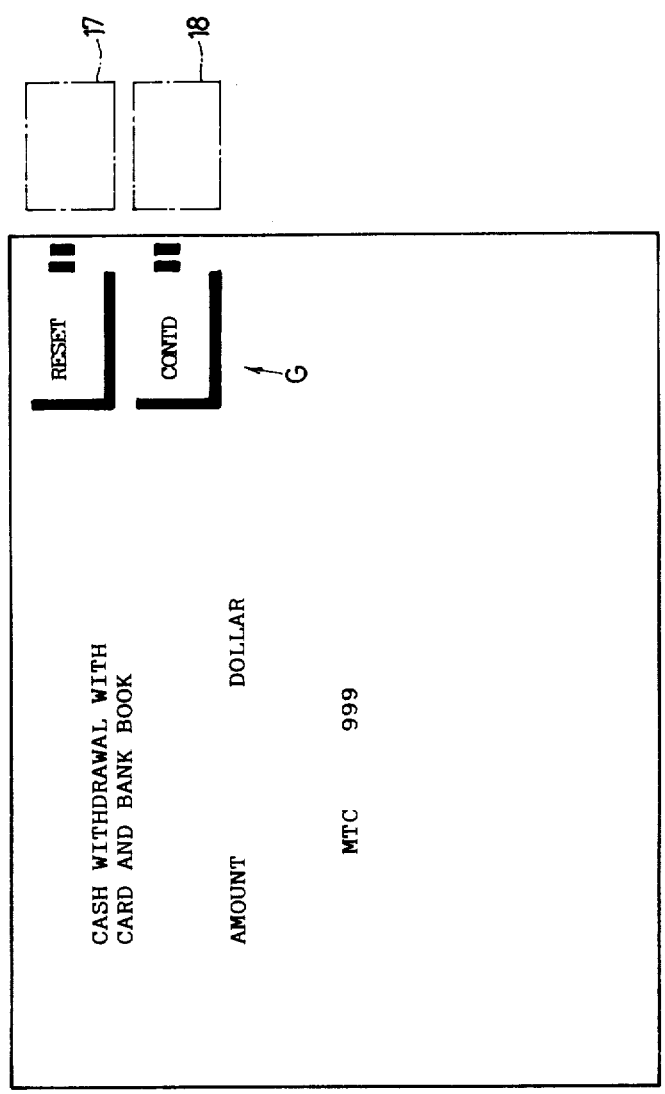
Figure 30:
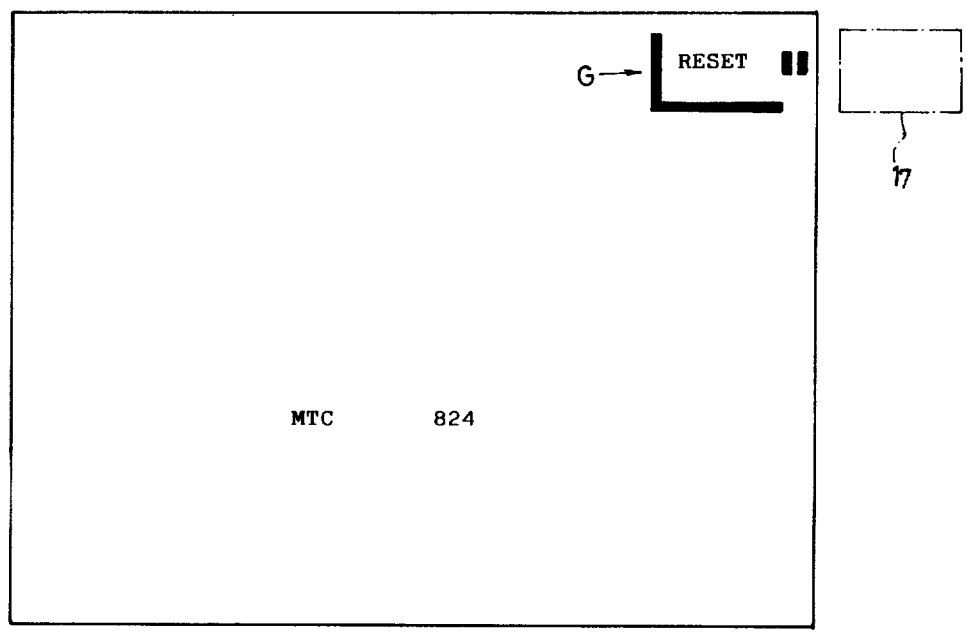
Figure 31:
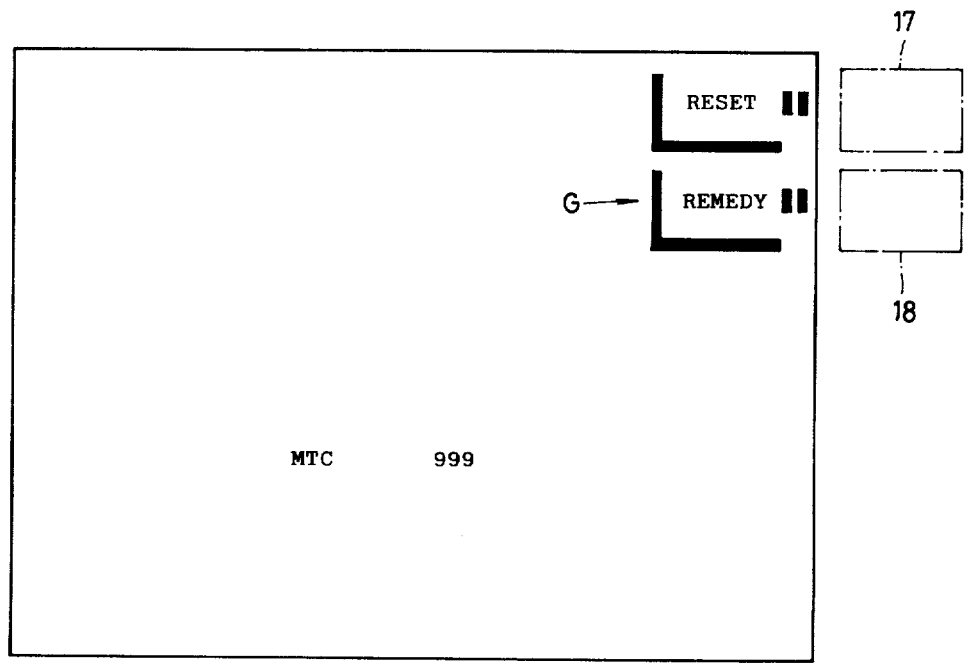

While transactions with use of a card and bank book for withdrawing cash have been described above, CRT 2 displays instructions for leading the customer to follow the specified procedure stepwise for other transactions. Such operations performed by the system 1 for the customer are herein referred to as "customer processing," while the term "(bank) clerk processing" as herein used refers to the procedure to be followed by the bank clerk for the maintenance and inspection of the system 1, his treatment of errors and like troubles, and the operation of the system 1 relating to such procedure and treatment. For the bank clerk processing, the CRT 2 also shows various displays or images, examples of which are illustrated in FIGS. 27 to 35. The image of FIG. 27 shows the functions of the buttons 11-18 when these buttons 11-18 are used in place of the switches 31-38 on the inner panel 24. At the locations corresponding to the function buttons 11-18, the image includes button frames G and function indicating terms, namely, TOTAL, SUBTOTAL, DATE, CASH (cash dispensing), IN COM (system in communication with the center), RESET, ON-LINE (or OFF-LINE) and USUAL (that is, usual transaction, or TEST). The date set is also shown. When the function buttons 11-16 are used for entering test items in the test mode, the functions of the buttons 11-16 are shown, as seen in FIG. 28. FIG. 30 shows a code identifying a particular error which has occurred. The codes identifying troubles including errors or indicating the causes of troubles are referred to as "maintenance codes" (hereinafter referred to as "MTC"). The system 1 has the function of automatically detecting usually expected troubles, which are identified by means of predetermined MTC's. These codes are stored in a specified memory, such as ROM 70 or RAM 80. With reference to FIG. 30, the function button 17 is used as a reset switch, and a button frame G and the term "RESET" are shown next to the button 17. FIG. 29 shows a display which is given when an error has occured during a transaction for withdrawing cash with use of a card and bank book. More specifically, the CRT 2 shows a message identifying this transaction, the sum to be dispensed, MTC, frames G for the buttons 17, 18 and the function indicating terms of "RESET" and "CONTD" (continued). For correcting errors, the bank clerk uses either one of the buttons 17 or 18. FIG. 31 shows a display which is given when an error has occurred during the forced selecting to be described later and which shows MTC and the functions of the buttons 17, 18.

Figure 32:
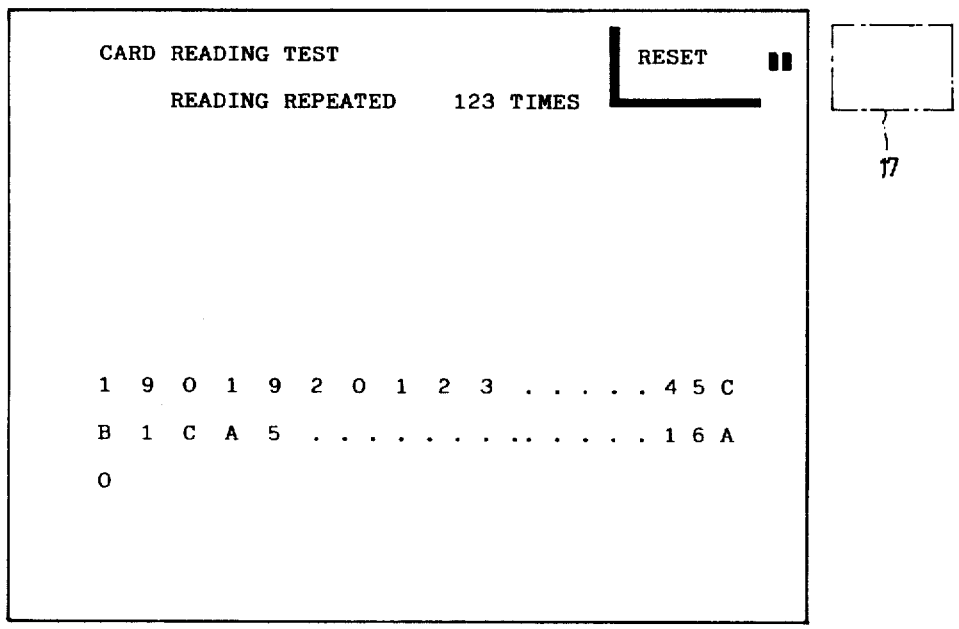
Figure 33:
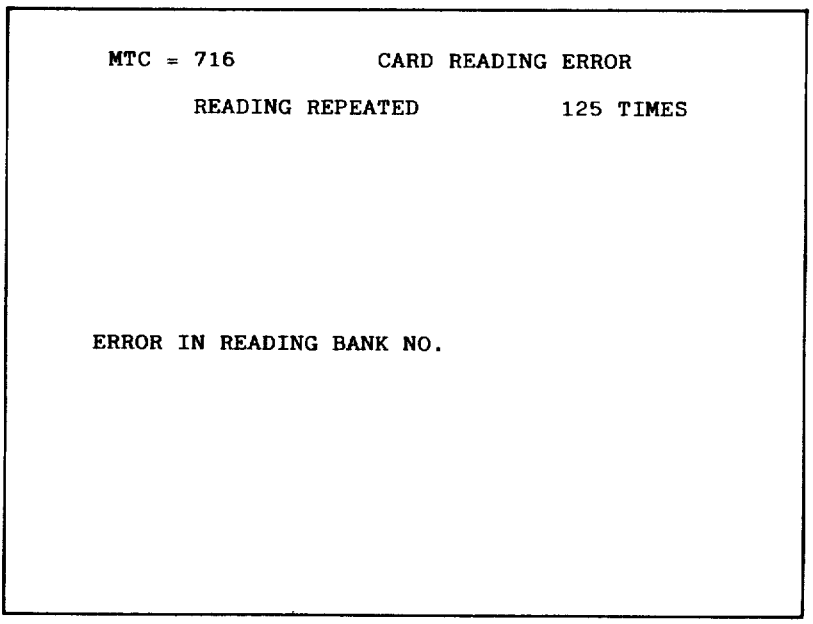
Figures 34, 35:
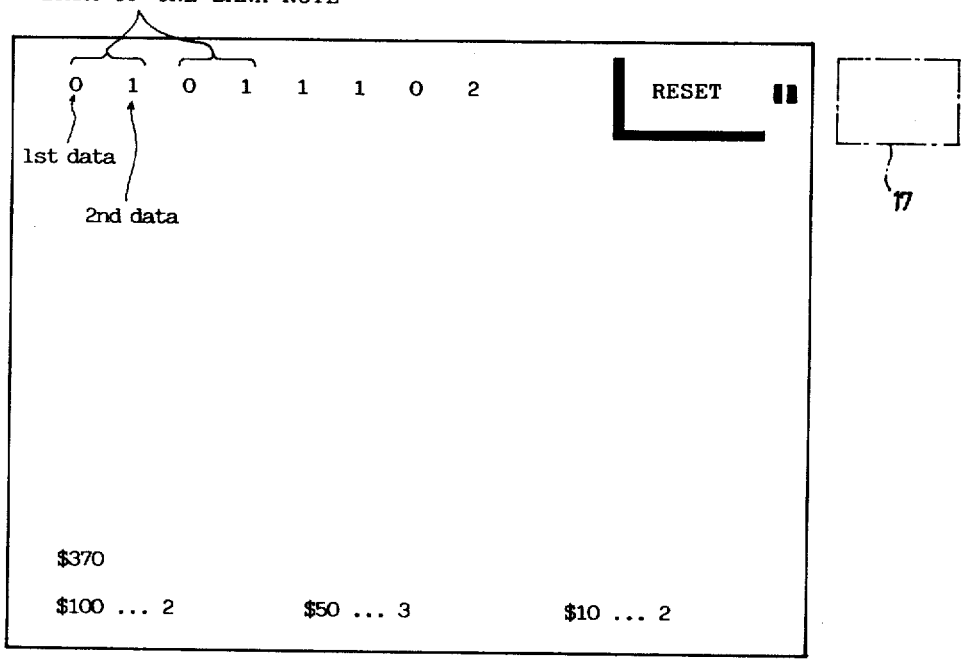

FIG. 32 shows an example of display for a card reading test. The CRT 2 shows the identification of the test, the number of times the card is read continually and the read data. FIG. 33 shows an example of display when an error has occurred. The CRT 2 shows MTC, the identification of the error, i.e. error in reading card data, when (e.g. in 125th time) the error occurred and the location where the error occurred. FIGS. 34 and 35 show examples of displays for a bank note discriminating test. FIG. 34 shows discriminating data. When an error occurred, the error is identified as shown in FIG. 35.

For such clerk processing, the button frames, function indicating terms and predetermined message codes for identifying test items and errors are also stored in the message illustration code memory 76.

FIG. 22 shows the overall operation of the banking transaction system 1, especially the steps of bank clerk processing. The system is started up by turning on the power supply to initialize the overall system (step 171). In this step 171, the display of FIG. 9 is given on the CRT 2. Steps 172-175 then follow to bring the system into an idle state (standby position). In this state the system is checked as to whether or not an input has been given through the clerk key 10 (step 172), whether or not some error has occurred (step 173), whether or not an input has been given by one of the switches 31-40 on the inner panel 24 (step 174), and whether or not one of the function buttons 11-13, 17-19 has been depressed with reference to the display of FIG. 9 to specify some transaction (step 175). When one of the function buttons 11-13, 17-19 is depressed while the display of FIG. 9 is on (YES for step 175), the customer processing shown in FIG. 7 is initiated. In response to the clerk key input given by step 172, the CRT 2 shows the display of FIG. 27 (step 176). If any one of the function buttons 11-18 is depressed (step 177), the button is read (step 178), and the process specified by the button (i.e. one of steps 181-188) is executed. With the change of the display on the CRT 2 to that shown in FIG. 27 in response to the clerk key input, the function buttons 11-18 serve as input switches for the clerk processing items. Accordingly to the clerk can select the desired process with reference to the function indicating terms on the CRT 2. With the present embodiment, the inner panel 24 is also usable for the clerk processing. If one of the switches 31-40 on the inner panel 24 is depressed in step 174, the switch is read (step 179) to perform the specified processing step (one of steps 181-188). If an error is detected in step 173, the error treatment to be described later follows.

FIGS. 23a to 23j show individual steps of clerk processing. In the case of totaling (step 181) shown in FIG. 23a, the accumulated or totaled data in the RAM 80 (FIG. 6) is read out and printed on the journal and receipt (step 191), and the RAM 80 is cleared of the total data (step 192). This is followed by step 172. Since this process is executed prior to the customer processing on the day concerned, the totaled data is the accumulation of the transactions on the preceding day. In the case of subtotaling (step 182) shown in FIG. 23b, the data accumulated in the RAM 80 is read out and printed on the journal and receipt (step 193). Step 172 thereafter follows.

FIG. 23c shows the process of date setting (step 183). The bank clerk sets the date (step 195), which is read and stored in RAM 80 (step 196). Based on the stored data, the display of date is changed (step 197). The data can be set in two ways. When the clerk depresses the function button 13 to initiate this process, he enters the date by the keyboard 3. The set date is displayed on the CRT (see FIG. 27). When the switch 38 on the inner panel 24 is manipulated for this process, the clerk turns the switch(es) 30 up or down to set the date. The date is indicated on the date indicator 29. The date may be indicated on the indicator 29 also when the function button 13 is used.

The cash releasing process (step 184) shown in FIG. 23d is an operation test for the cash counting means and transport means. Of the cash stored in a cash container, ten $100 bank notes are counted up (step 201), and then ten $50 bank notes are counted up (step 202). The two groups of bank notes are transferred to a cash box for recovery (step 203), whereby the means are checked for the possible failure (step 204). When there is no failure, the process is completed, and step 172 follows. In the event of malfunctioning, error treatment follows as will be described later. If desired, the CRT 2 may be adapted to display the faultless result. When other kinds of bank notes, such as $10 and $5 bank notes, are used, the system is of course checked similarly for these notes.

The communication process (step 185) shown in FIG. 23e detects whether or not the system is in the on-line mode with reference to the on-line/off-line setting flag of the RAM 80 (step 205). When in the on-line mode, the system transmits an opening message to the center (step 206), and a pilot lamp in the indicator 25 on the inner panel 24 is turned on to indicate that the system is in the on-line mode. The CRT 2 further shows the function indicating term "IN COM" for the switch 15 as shown in FIG. 27. The term "IN COM" is shown only when in the on-line mode and not shown when in the off-line mode. If the system is not in the on-line mode (NO for step 205), i.e. in the off-line mode, step 172 follows.

In the reset process (step 186) shown in FIG. 23f, the system is initialized mechanically and electrically in succession (steps 211 and 212), followed by step 172.

Line mode process is effected by different methods, i.e. by the switch 37 on the inner panel 24 (FIG. 23g), or by the function button 17 (FIG. 23h). FIG. 27 shows the function indicating terms "ON-LINE (or OFF-LINE)" and "USUAL (or TEST)" which represent the modes selected. If the button 17 is pushed when "ON-LINE" is on in corresponding relation thereto, the mode changes to the off-line mode, while if the button 17 is depressed when "OFF-LINE" is on, the mode changes to the on-line mode. Similarly if the button 18 is depressed when "USUAL" is on, the mode changes to the test mode, while if the button 18 is depressed when "TEST" is on, the mode changes to the usual mode.

With reference to FIG. 23g, when the system is set in the on-line mode or off-line mode by the line mode switch 37 on the inner panel 24, the set mode is stored in the RAM 80 (step 215), and the CRT 2 shows the image of FIG. 27, with the function indicating term for the button 17 changed to the one representing the set mode (step 216). In the case of clerk processing with use of the inner panel 24, the display of step 216 need not always be given.

With reference to FIG. 23h, when the button 17 is depressed, the existing line mode is detected with reference to the on-off line setting flag of RAM 80 (step 221). If it is on-line mode, the off-line mode is set with the flag (step 222), and the function indicating term on the CRT 2 (FIG. 27) is changed to "OFF-LINE" (step 223). If the existing line mode is the off-line mode, the on-line mode is set with the flag (step 224), and "ON-LINE" is shown on CRT 2 (step 225).

Figure 23I:
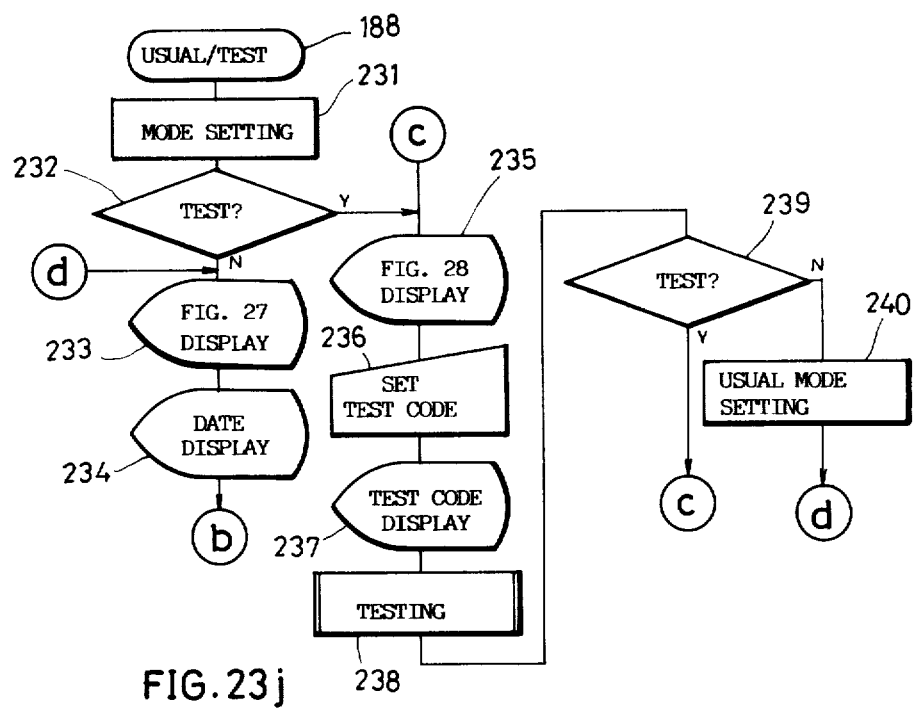
Figure 23J:
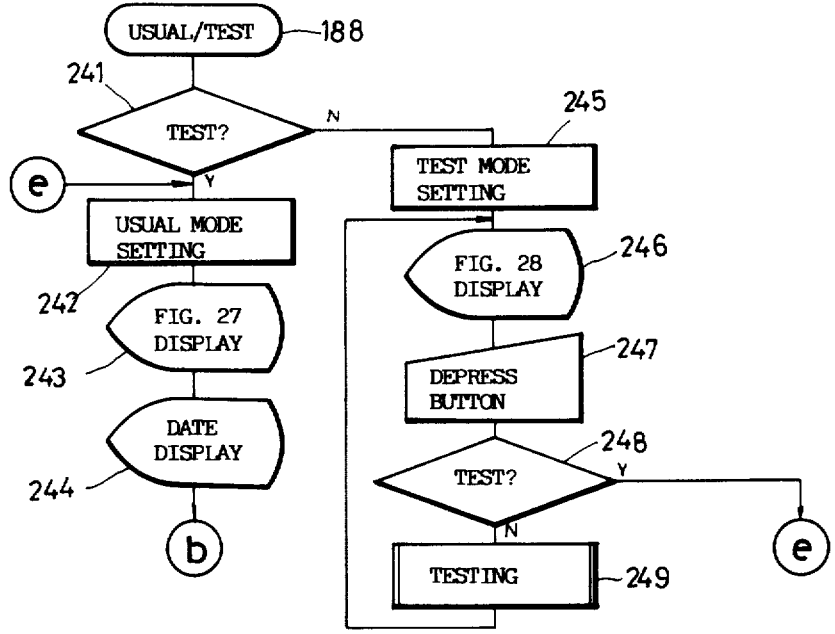

The usual mode or the test mode is alternatively selected (step 188) by one of different procedures, i.e. by the switch 38 on the inner panel 24 or by the function button 18 at the right of the CRT 2. When the switch 38 on the inner panel 24 is used as shown in FIG. 23i, the set mode is stored in the RAM 80 with the mode setting flag (step 231), and step 232 detects whether or not the set mode is test mode. If it is not the test mode, the image of FIG. 27 is shown with the term "USUAL" for the button 18 (step 233), and the date is given on the date indicator 29 on the inner panel 24 (step 234) for the completion of the process.

When step 232 reveals the test mode, step 235 follows in which the image of FIG. 28 is shown on the CRT 2 with "TEST" on for the switch 18. The clerk sets a test code with the switch 30 of the date setting means 28 (step 236), whereupon the date indicator 29 shows the set test code (step 237). The set test is performed (step 238). Examples of tests are a local test for testing terminal units, loop test for testing print boards for connection, card reading test, bank book reading test and bank note discriminating test. After the desired test has been performed, step 239 detects whether or not the system is in the test mode. If it is in test mode, step 235 follows. Otherwise, the RAM 80 is set for the usual mode (step 240) as in step 231. Step 233 then follows. The display of step 233 can be dispensed with.

When the button 18 is depressed based on the image of FIG. 27 on the CRT 2 (see FIG. 23j), the existing mode is checked as to whether or not it is the test mode (step 241). If it is the test mode, the system is now in the usual mode, so that the RAM 80 is set for the usual mode (step 242,) and the image of FIG. 27 is given on the CRT 2 with the term for the button 18 changed to "USUAL" (step 243). The date is shown on the data indicator 29 (step 244) to complete the process.

When step 241 shows that the existing mode is the usual, the RAM 80 is set for the test mode (step 245), and the image of FIG. 28 is shown on the CRT 2. Since the image shows test codes as function indicating terms for the function buttons 11-16, the clerk can enter the desired test with one of the buttons 11-16. For example, TEST 1 corresponds to the local test, TEST 2 to the loop test, TEST 3 to the card reading test, TEST 4 to the bank note reading test and TEST 5 to the bank note discriminating test. The term "TEST" is shown for the button 18. Upon depression of one of the buttons 11-16 and 18 (step 247), step 248 detects whether or not the button 18 has been depressed (step 248). If one of the buttons 11-16 other than the button 18 has been depressed, the corresponding test is performed (step 249). Step 246 then follows. When the button 18 has been depressed, the system is in the usual mode. Step 242 therefore follows.

FIG. 24 shows the process to be executed when some error, malfunction or like trouble has occurred in the system 1 during the customer processing. In the event of a trouble occurring, the CRT 2 shows the identification of the trouble and a function indicating message or term indicating the procedure to be followed to remedy the trouble in corresponding relation to the function button concerned. The clerk follows the remedying procedure by depressing the function button with reference to the display.

With reference to FIG. 24a, when a trouble has been detected (step 250), the cause of the trouble is stored in the RAM 80 (step 251) and printed on a receipt (step 252). The CRT 2 displays a waiting message like the one shown in FIG. 14 (step 253), and the clerk is called. Troubles in the system 1 are detected by the system 1 itself, or the control center detects troubles in the system. In the latter case, the center detects, for example, an error in the message forwarded from the system 1. In such a case, the center transmits the code of forced selecting to the system 1 concerned. Upon receipt of the forced selecting code, the system 1 performs trouble remedying treatment in one way or another as will be described later and thereafter delivers a test message to the center. On receipt of the test message, the center realizes that the system 1 has been restored to the original state and delivers a restoration message to the system 1. On receipt of this message in response to the test message, the system 1 returns to the normal state.

When the waiting message is shown on the CRT 2 (step 253), the system waits until an input is given by the clerk key 10 (step 254). In response to the clerk key input, the system discharges the bank book, card or bank notes which have been placed in the system and also the receipt printed in step 252 (step 255). This step 255 may be executed in the reset process to be described later. Step 256 checks whether or not the forced selecting code has been received from the center. If the code has been given, step 271 follows; otherwise step 257 follows.

In the absence of the forced selecting code, step 257 checks whether or not an error has occurred in turning the page of the bank book. With transactions using the bank book, unbooked information is received from the center and is entirely entered in the book. At this time, it is likely that the space available on the opened page is insufficient for recording the unbooked information. Thus there arises the need to turn the page, or the bank book must be replaced with a new one. For page turning, the book must be reinserted into the system with the next page opened. Usually, therefore, the CRT 2 shows an instruction to this effect to guide the customer for reinsertion. However, the customer may fail to follow the instruction when not accustomed to the operation of the system. Further there is the likelihood that the magnetic strip affixed to the bank book involves a recording error or the strip has been stained. In such a case, the page or printing line will not be detected accurately, and the system is likely to erroneously detect the need to turn the page. Such an incidence is referred to as page turning error. The replacement or renewal of the bank book is handled by the clerk, since the system is not adapted for this procedure.

Figure 24B:
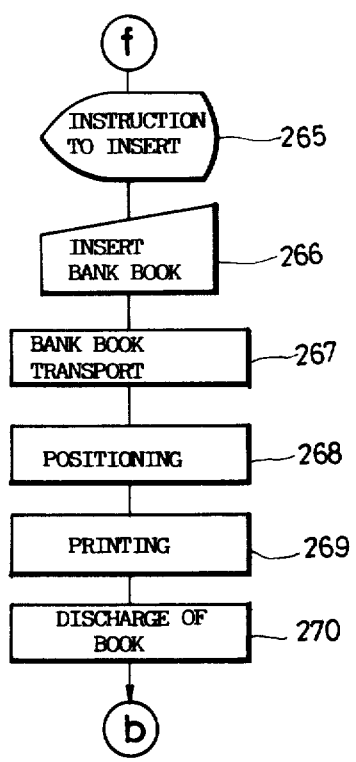

For turning the page, the CRT 2 shows the image of FIG. 29 (step 258). This image includes the kind of the transaction (cash withdrawal with card and bank book), the sum to be dispensed, an MTC representing a page turning error, and "RESET" and "CONTD" showing the functions of the buttons 17, 18. When the button 17 for reset is depressed (step 259), resetting is executed (step 264). Depression of the button 18 for continued processing is followed by this process as shown in FIG. 24b (step 260).

Continued processing means that printing of unbooked information is continued on the opened page without checking the bank book in the usual manner. The term "checking of the bank book" is used as meaning, for example, to confirm the account number by reading the magnetic stripe, to confirm that the opened page is the next page, and to confirm that the opened page is blank. With reference to FIG. 24b, the CRT 2 shows a display resembling the image of FIG. 11 and instructing insertion of the bank book (step 265). When the clerk inserts the book with the next page opened (step 266), the book is transported (step 267), the first line of the page is positioned properly for printing (step 268), and the remaining items of the unbooked information is printed (step 269). On completion of printing, the bank book is discharged (step 270), whereby the process is completed. The printing is resumed immediately after the positioning without any intervening checking step. It is assumed that the insertion of the book by the clerk involves no error.

When the card or book remains unremoved upon the lapse of a specified period of time after it has been returned during customer processing (e.g. steps 116, 117 in FIG. 8), this case may be handled as an occurrence of error, with a display similar to that of FIG. 29 to urge the clerk to enter "CONTD" input. In the case of withdrawing transaction, cash is thereafter delivered (step 118).

When step 257 proves "NO," step 261 follows, in which the image of FIG. 30 is shown on the CRT 2. This image includes an MTC identifying the error and the function indicating term "RESET" corresponding to the button 17. The errors other than the page turning error are all the other errors, including the above-mentioned renewal of bank book, reading error and transport error, for example. With reference to the display of FIG. 30, the clerk identifies the error and performs the treatment therefor. When a reset input is thereafter given by the button 17 (step 262), resetting is executed (step 263).

In the case of forced selecting, the system is checked as to whether or not it can be restored automatically (step 271). Examples of cases in which automatic remedy is infeasible are an error which has occurred during error treatment and an error in the communication line of the receiving system. If the error can be remedied automatically, the transaction is continued (step 272). This process differs depending on whether it is before or after the communication with the center. The transaction is cancelled if it is before the communication. If otherwise, the transaction is executed to completion. A test message is thereafter given to the center, and this is printed on a receipt to complete the process (step 273).

If it is impossible to effect automatic remedy, the CRT 2 shows the image of FIG. 30 (step 274), whereupon the clerk follows the specified remedying procedure in accordance with the type of the error and thereafter feeds a reset signal by the button 17 (step 275). Thus resetting is executed (step 276). Step 277 shows the image of FIG. 31 on the CRT 2. If a reset input is thereafter given again by the button 17 (step 278), resetting is executed (step 279). If a remedy input is given by the button 18 (step 280), step 273 follows to give the above-mentioned test call. The remedy input shown in FIG. 31 is an input preceding the test call, and the button 18 is used. The image of FIG. 31 need not always include the MTC and "RESET," but "REMEDY" only may be given. In this case the steps 278, 279 are dispensed with.

Figure 25:
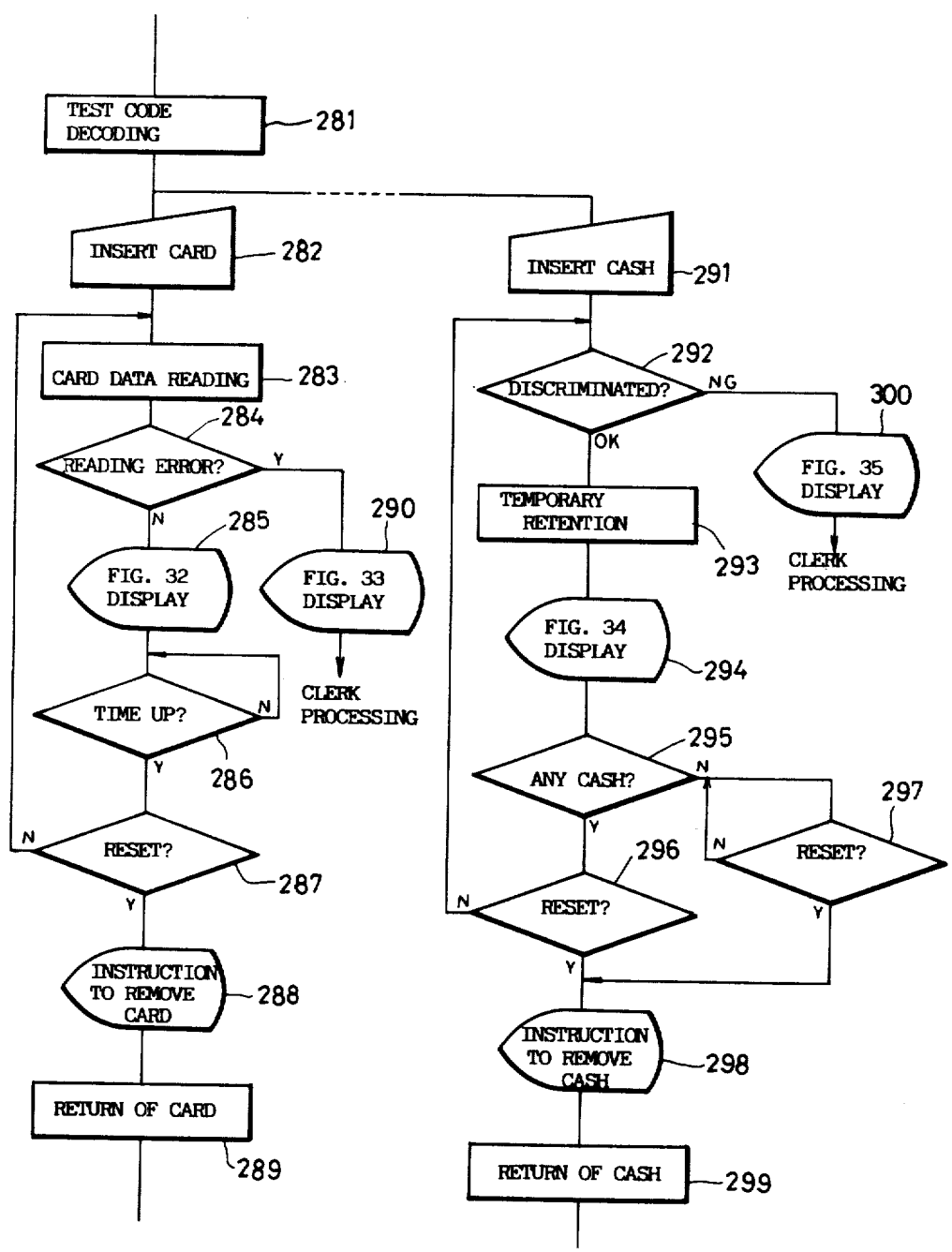
FIG. 25 is a flow chart showing details of testing operations.

FIG. 25 shows some of the test processes of steps 238 and 249, namely card reading test and bank note discriminating test procedures. When a test code is entered by the switch 30 or one of the function buttons 11-16 (step 236 or 247), the test code is decoded to execute the process in accordance with the decoded result. When a card reading test number is set, step 282 follows. Upon insertion of the card into the inlet 6 (step 282), the card data is read (step 283). Step 284 checks whether or not the reading involves an error. If there is no error, the read data is shown on the CRT (step 285) (FIG. 32). Upon the lapse of a predetermined period of time (step 286), step 287 checks as to whether or not the reset switch 35 on the inner panel 24 or the button 17 has been depressed (step 287). If it has not been depressed, step 283 follows again to repeat the card data reading again. In the case of card reading test, the transport means provided inside the card inlet 6 is also controlled in accordance with the steps 282-289. When the card is repeatedly read, the card is repeatedly transported by the transport means. When the reset button has been depressed in step 287, the CRT 2 gives a display resembling the image of FIG. 15 for the instruction to remove the card (step 288), and the card is returned (step 289). When a reading error is detected in step 284, the CRT 2 shows information relating to the reading error (step 290, FIG. 33). In the presence of any error, the test is interrupted, followed by processing by the clerk.

Figure 26:
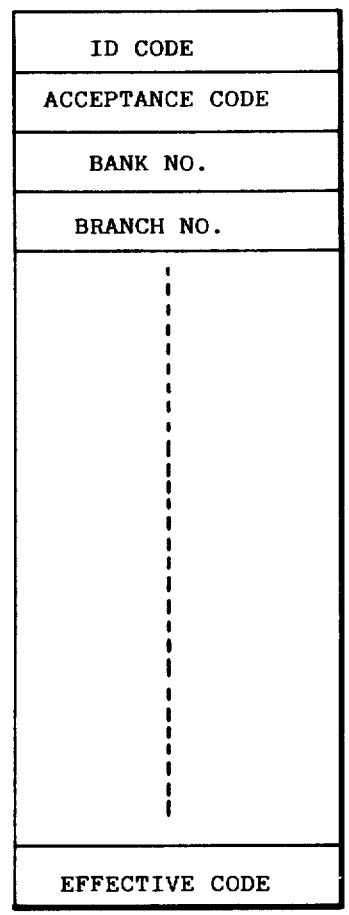
FIG. 26 shows data recorded in a magnetic card.

FIG. 26 shows the items of information recorded in the magnetic card, namely, bank ID code, bank acceptance code, bank number, branch number, customer's ID number, effective code, and other necessary data. The bank ID code is used for distinguishing the card from those used for the other kinds of services, thus indicating that the card is used for banking services. The bank acceptance code specifies the use of the card. The effective code indicates that the card is effectively usable.

FIG. 32 shows an examples of reading data display in step 285. The first line indicates that the test is a card reading test, and the second line shows the number of repetitions of card reading in continuous reading test. Given therebelow is the data of card reading which is expressed in every two byte according to hexadecimal notation. The CRT 2 also shows the function indicating term "RESET" for the button 17. FIG. 33 shows an example of display given when there is an error in reading card data (step 290).

Bank note discriminating test, when set, commences with step 291. With the present embodiment, a plurality of bank notes can be inserted at a time into the cash inlet 4 of the system. The inserted bank notes are separated one by one and checked for the face value and genuineness. On insertion of bank notes (step 291), bank note discriminating process is started. The bank notes are checked for discrimination up to four times per note. After the notes are discriminated by being checked not more than four times (step 292), the notes are temporarily held in a retainer (step 293). The discriminating result is shown on the CRT 2 (step 294, FIG. 34). Step 295 checks whether or not any notes still remain in the inlet 4. If some notes still remain, step 296 checks whether or not the button 35 or 17 has been depressed. In the absence of the reset input, step 292 follows again to repeat reading and discrimination of the bank notes.

When the interior of the inlet 4 becomes empty, the reset input is checked (step 297). In the presence of reset input, step 298 follows. Even when the bank note is present inside the inlet 4, step 298 follows if the reset button is depressed. Step 298 shows an instruction for withdrawing the bank notes on the CRT 2. The temporarily retained bank notes and the bank notes in the inlet 4, if any, are returned to the cash return outlet 5 (step 299).

If there is a reading error even after reading the bank notes for discrimination four times in step 292, the reading process is discontinued, and the reading error data is shown on the CRT 2 in step 300 (FIG. 35) for further treatment by the clerk.

FIG. 34 shows an example of display showing bank note reading and discriminating data in step 294. This data includes three items of data, namely the note face values, scanning direction for reading and number of repetitions of reading. In the present case three note face values are contemplated, namely, $100 note, $50 note and $10 note, which are represented by two binary digits, i.e. 00, 01 and 10. There are four scanning directions, namely, forward on the front side, reverse on the front side, forward on the rear side and reverse on the rear side, which are represented by 00, 01, 10, 11. A number of binary notation of four figures is prepared with use of numbers of binary notation of two figures representing the scanning direction as the first and second figure and is converted to 0, 1, ... 9, A, B, C, D, E, F according to hexadecimal notation to use as the first data. For example, the case of $50 note which is read forward on the front side, the combination affords a number of binary notation of four figures 0110=6. Thus the first data is 6. The number of repetitions of reading is expressed in terms of a number of hexadecimal notation, which is used as the second data. The number of repetition of reading is such that when bank notes are completely discriminated in step 292, the number of repetitions the notes are read is taken as this number. Accordingly the reading discrimination data for a bank note comprises the first and second data. The CRT 2 shows the discriminating data in the order of: first data of first note, second data of the same, first data of second note, second data of the same, as arranged horizontally. The CRT 2 further shows at the lower portion thereof the sum of the discriminated bank notes, and the number of each different face value of the notes discriminated. The function of the button 17, "RESET" is also shown.

When an error has occurred in discriminating the bank notes (step 300), a display shown in FIG. 35 as an example is given. The CRT 2 shows MTC, message identifying the error, the sum of the discriminated bank notes and the cause of the error.

Although test procedures have been described with respect to card data reading and discriminating test, writing in the card, reading of and writing in the magnetic stripe on the bank book, etc. can be checked exactly in the same manner as above.

In the foregoing embodiment, MTC is used to indicate the trouble developed in the customer processing as well as the cause thereof, it is also possible to show the cause of detected trouble and instructions to the clerk on the CRT 2 in terms of a message. In this case, the message illustration code memory 76 has stored therein codes of messages representing the causes of expected troubles and instructions to the clerk.

FIG. 36 shows an example of the image which will be shown on the CRT 2 when a trouble has occurred during communcation between the system 1 and the center. CTR and MTC are shown in the first line of the display. CTR shows the contents of a progress indicating counter, which counts the degree of progress of a series of transaction processes. For instance, the procedures or processes of steps 100 to 118 in FIG. 8 are divided into a plurality of stages, and the counter is advanced by one on completion of each step. Accordingly CTR indicates the stage to which the processing has progressed when a malfunction or failure occurred. Simplified maintenance codes for the clerk may be shown in place of, or in addition to, MTC. FIG. 36, lines 2 to 4 show the cause of trouble in terms of a message. In this case, there is a disagreement between the sum claimed by the customer, i.e. $58, and the sum indicated by the center, i.e. $62, hence an error. Line 5 shows the type of transaction, i.e. withdrawal of cash with use of a card and bank book. Line 6 shows the customer's account number. The last line shows a message giving instructions to the clerk for the procedure to be followed. It is seen that there is a need to make an inquiry at the center.

FIG. 37 shows an image which is shown on the CRT 2 when an error occurred in the bank note releasing process. This drawing, line 2 shows that a bank note has jammed in the path of transport of bank notes between bank note detectors S5 and S6. Line 3 shows that the sum to be dispensed is $58 including one $50 note and eight $1 notes. The display says at the bottom that the center file has been renewed, that $58 claimed must be delivered to the customer and that there is the need to effect initial resetting after the jamming note has been removed. Thus instructions are given to the clerk. The CRT 2 is cleared of the displays shown in FIGS. 36 and 37 after the clerk has executed the instructed treatment for eliminating the causes of the troubles.

The occurrence of troubles may be followed immediately by displays such as those given in FIGS. 36 and 37. Alternatively an instruction for waiting (step 253) may be given first as already described, and the CRT 2 may thereafter display on the CRT 2 information relating to the trouble encountered. Information relating to troubles may be shown without use of the bank clerk key 10. In addition to terms and textual messages, graphic illustrations may be used for presenting on the CRT 2 information relating to troubles.

Figure 38:
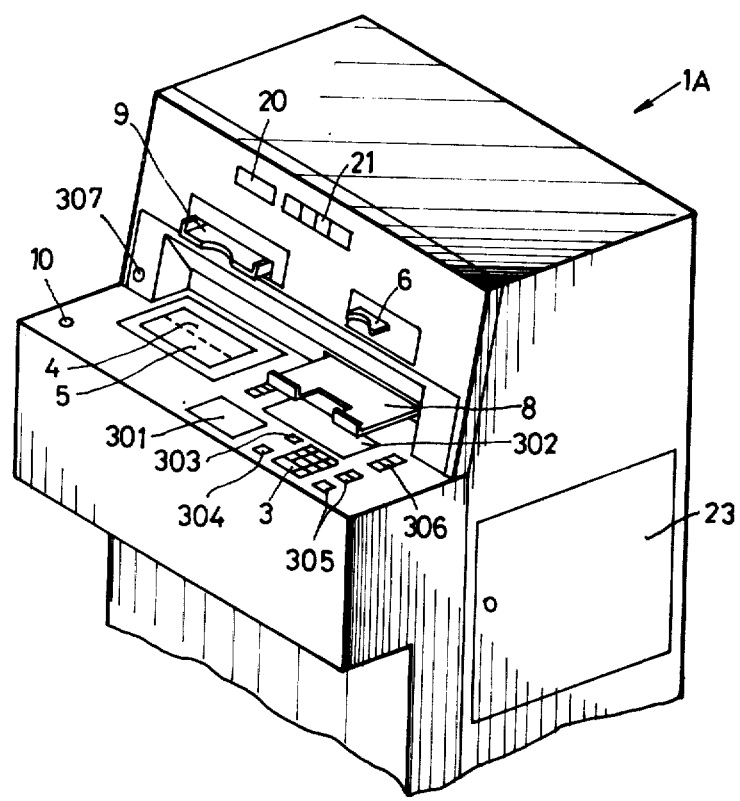
FIG. 38 is a perspective view showing another banking transaction system embodying the present invention.

FIG. 38 shows another banking transaction system embodying the invention. The parts shown in this drawing and the same as those of FIG. 1 are referred to by like reference numerals. On a forwardly projecting horizontal panel of the system 1, there is provided a visual display unit 301 for showing the kinds of transactions and sums involved therein for customer processing and also showing the causes of possible troubles and related instructions to the clerk. While the display unit 301 of this embodiment is a plasma display, CRT is of course usable. The display unit 301 is provided at the right side thereof with a ten-key keyboard 3 for entering ID numbers, amounts of money and other items of numerical information, confirmation key 303, cancellation key 303 and key 305 for specifying units of money. The panel is further provided with a procedure indicator 302 for showing the steps of procedure to be executed by the customer in the proper order, and a transaction specifying the key 306 for specifying the type of desired transaction. A cash outlet 8 on a vertical panel serves also as a receipt outlet. This panel has a button 307 for calling the clerk. The system 1A has an inner panel in one side portion thereof. In this way, the display unit 301 for showing kinds of transactions, amounts of money involved in transactions, information relating troubles may be provided separately from the procedure indicator 302.

I claim:

1. A transaction performing system for executing, upon operation by a customer, one of a plurality of predetermined transactions, each of said transactions requiring the performance of a plurality of sequential steps in a given order by said customer, said system also including malfunction detection and correction means operable by a clerk, said system comprising:
a memory means having stored therein a plurality of transaction procedure specifying textual messages, a plurality of transaction procedure graphic illustrations, and a plurality of textual messages describing specific possible malfunctions and corrective procedures therefor;
a console having mounted therein an electronic display unit and a plurality of physically manipulative functions units operable by said customer of said clerk;
display control means operatively interconnecting said memory means, said electronic display unit, and said function units;
said function units being controllable by said customer for causing said display control means to visually present on said display unit, simultaneously, a transaction procedure textual message and a correspnding transaction procedure graphic illustration relating to each sequential transaction step to be performed by said customer; and
said function units being controllable by said clerk, when a system malfunction is detected, to cause said display control means to present on said display unit a textual message describing said malfunction and the corrective procedure therefor.

2. A transaction system as claimed in claim 1, wherein said function units include a plurality of function buttons positioned adjacent to said display unit and, during execution of a step by a customer, said display control means presents on said display unit at a location adjacent to each operative function button a term indicating the function of the button for that step and a frame partially surrounding the function indicating term to manifestly associated said term with its corresponding button.

3. A transaction system as claimed in claim 1, wherein said function units include a plurality of function buttons positioned adjacent to said display unit and a clerk controlled function unit operable, when a system malfunction is detected, to cause said display control means to present on said display unit adjacent to a selected function button a function indicating term describing the corrective procedure to be executed by said clerk.

4. A transaction system as claimed in claim 1, wherein said function units include a clerk key to be actuated by a clerk, and means operable by said clerk when a system malfunction is detected and said clerk key is actuated, to cause said display control means to present on said display unit a textual message describing the cause of said malfunction and providing the clerk with corrective procedure instructions.

5. A transaction performing system operable by a customer for executing one of a plurality of transactions, each of said transactions requiring the sequential performance of a plurality of function steps by said customer, said system also including clerk operable malfunction detection and correction means, said system comprising:

electronic memory means having stored therein a plurality of transaction procedure step messages and a plurality of textual messages representing possible system malfunctions and corrective procedures therefor;

electronic display means capable of displaying said textual messages;

first means operable by said customer to cause said display means to display sequentially the transaction procedure step messages to instruct said customer to perform each function step of a desired transaction; and second means operable by said clerk, when a malfunction is detected, to cause said display means to display a textual message which identifies the cause of said detected malfunction and provides instructions for correcting said malfunction.

6. A transaction performing system operable by a customer for executing one of a plurality of multi-step transaction procedures comprising:

an electronic visual display unit capable of displaying messages composed of alphanumeric characters;

a plurality of function buttons adjacent to said display unit;

an electronic memory means having stored therein alphanumeric messages relating to transaction step procedures, button function terms corresponding to said transaction procedures, and alphanumeric messages relating to system operation processes;

display control means operable by said customer to cause said display unit to present said transaction step procedure messages and to simultaneously present the corresponding transaction procedure button function terms in positions on said display unit adjacent to the buttons intended to be operated for each procedure step;

a clerk key to be actuated by a clerk;

said display control means being operable by said clerk, after actuation of said clerk key, to cause said display unit to display said system operation process messages.

7. A system as claimed in claim 6, further comprising malfunction detecting means, malfunction identification alphanumeric messages stored in said memory means, and means operable after actuation of said clerk key to cause said display unit to display a malfunction identification message corresponding to a detected malfunction.

8. A system as claimed in claim 6, further comprising malfunction detecting means, malfunction identification and correction instruction alphanumeric messages and corrective button function terms stored in said memory means, and means operable after actuation of said clerk key to cause said display unit to display a malfunction identification and correction instruction message corresponding to a detected malfunction, and to display on said display unit adjacent the appropriate function button the corresponding corrective button function term.

9. A system as claimed in claim 6, wherein said system includes malfunction detecting means and said memory. has stored therein messages representing the causes of possible system malfunctions and instructions to the clerk for correction of such malfunctions, and said display control means is operable by said clerk after actuation of said clerk key to cause said display unit to display the message corresponding to a detected malfunction.

10. A system as claimed in claim 6, wherein said system includes means for testing operation of the system, and means operable by said clerk for displaying on said display unit instructions for conducting such operational tests.

11. A system as claimed in claim 6, wherein said system includes means for testing operation of the system and display control means operable by said clerk to cause said display unit to show the results of such operational test.

12. A system as claimed in claim 11, wherein if a malfunction occurs during said test, said display control means is operable to show on said display unit information relating to such malfunction.

13. A system as claimed in claim 6, wherein said memory means also has stored therein system operation button function terms corresponding to said system operation processes, said display control means being operable to present said system operation button function terms on said display unit adjacent to the appropriate function buttons simultaneously with the presentation of said system operation process messages, and said system further includes means for executing the specified system operation process upon actuation of a function button by said clerk.

14. A system as claimed in claim 15, wherein said system operation processes include totaling, subtotaling, date setting, cash releasing, communication with a central unit, resetting, line mode setting and operation mode setting.

15. A system as claimed in claim 6, wherein said memory means also has been stored therein system operation button function terms corresponding to said system operation processes and, when operated by said clerk, said display control means also presents on said display unit adjacent to the appropriate function buttons the button function terms relating to said system operation process messages.

16. A system as claimed in claim 15, further comprising means for storing date information in said memory means, means operable by said clerk for resetting said date information stored in the memory, and means for presenting said date information on said display unit.

17. A system as claimed in claim 15, further comprising means for operation by said clerk to change the mode of the system, and means for showing on said display unit the mode set.

* * * * *